US009313425B2

(12) United States Patent
Hagihara

(10) Patent No.: US 9,313,425 B2
(45) Date of Patent: Apr. 12, 2016

(54) IMAGE PICKUP DEVICE

(71) Applicant: OLYMPUS CORPORATION, Tokyo (JP)

(72) Inventor: Yoshio Hagihara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 263 days.

(21) Appl. No.: 13/909,203

(22) Filed: Jun. 4, 2013

(65) Prior Publication Data

US 2013/0327925 A1 Dec. 12, 2013

(30) Foreign Application Priority Data

Jun. 7, 2012 (JP) ................................ 2012-129765

(51) Int. Cl.
*H04N 5/378* (2011.01)
*H04N 5/335* (2011.01)
*H04N 5/357* (2011.01)

(52) U.S. Cl.
CPC ........... *H04N 5/3355* (2013.01); *H04N 5/3575* (2013.01); *H04N 5/378* (2013.01)

(58) Field of Classification Search
CPC ... H04N 5/3355; H04N 5/378; H04N 5/3575; H04N 5/4401; H04N 5/228; H04N 5/3765; H03M 1/56; H03M 1/72; H03M 1/60; H01L 27/146
See application file for complete search history.

(56) References Cited

U.S. PATENT DOCUMENTS

| 8,508,635 | B2* | 8/2013 | Tanaka | 348/294 |
| 8,558,729 | B2* | 10/2013 | Tanaka | 341/169 |
| 2002/0116426 | A1* | 8/2002 | Swami | 708/235 |
| 2011/0205100 | A1 | 8/2011 | Bogaerts | |

FOREIGN PATENT DOCUMENTS

| JP | 2005-311933 A | 11/2005 |
| JP | 2005-347931 A | 12/2005 |
| JP | 2009-033297 A | 2/2009 |

(Continued)

OTHER PUBLICATIONS

Notice of Reasons for Rejection dated Feb. 3, 2015, issued in corresponding Japanese Patent Application No. 2012-129765, w/English translation. (4 pages).

(Continued)

*Primary Examiner* — Francis M Legasse, Jr.
*Assistant Examiner* — Don Williams
(74) *Attorney, Agent, or Firm* — Westerman, Hattori, Daniels & Adrian, LLP

(57) ABSTRACT

An image pickup device may include: an image capturing unit; a reference signal generation unit; a comparison unit that compares analog signals to the reference signal and ends the comparison process at a timing at which the reference signal satisfies a predetermined condition with respect to the analog signals; a clock generation unit; a latch unit that retains the low-order phase signal as a latch signal at a timing related to the end of the comparison process; a count unit that counts a signal related to one of the low-order phase signals and generates a high-order digital signal; a detection unit that generates a low-order digital signal by sequentially comparing logic states of a plurality of bits of the latch signal retained by the corresponding latch unit and encoding the latch signal; and an arithmetic unit that performs an arithmetic process.

6 Claims, 18 Drawing Sheets

(56) References Cited

FOREIGN PATENT DOCUMENTS

| | | |
|---|---|---|
| JP | 2009-089066 A | 4/2009 |
| JP | 2009-159331 A | 7/2009 |
| JP | 2011-023887 A | 2/2011 |
| JP | 2011-055196 A | 3/2011 |
| JP | 2011-082929 A | 4/2011 |
| JP | 2011-160318 A | 8/2011 |

OTHER PUBLICATIONS

Office Action dated Jun. 16, 2015, issued in counterpart Japanese application No. 2012-129765 (w/English translation) (6 pages).

* cited by examiner

IMAGE PICKUP DEVICE

BACKGROUND OF THE INVENTION

1. Field of the Invention

The present invention relates to an image pickup device.

Priority is claimed on Japanese Patent Application No. 2012-129765, filed Jun. 7, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Japanese Unexamined Patent Application, First Publication No. 2005-347931 and Japanese Unexamined Patent Application, First Publication No. 2009-33297 disclose known examples of the configurations of image pickup devices in accordance with the related art. First, the configuration and process of an image pickup device in accordance with Japanese Unexamined Patent Application, First Publication No. 2005-347931 will be described.

FIG. 18 is a diagram illustrating the configuration of a (C)MOS sensor in accordance with the first related art disclosed in Japanese Unexamined Patent Application, First Publication No. 2005-347931. An image pickup device 1001 illustrated in FIG. 18 includes an image capturing unit 1002, a vertical selection unit 1012, a reading current source unit 1005, an analog unit 1006, a count unit 1018, a ramp unit 1019, a column processing unit 1015, a horizontal selection unit 1014, an output unit 1017, and a control unit 1020.

The control unit 1020 controls each unit such as the vertical selection unit 1012, the reading current source unit 1005, the analog unit 1006, the count unit 1018, the ramp unit 1019, the column processing unit 1015, the horizontal selection unit 1014, and the output unit 1017. The image capturing unit 1002 includes unit pixels 1003 that each include a photoelectric conversion element and are arrayed in a matrix form. The image capturing unit 1002 generates a pixel signal according to the amount of an incident electromagnetic wave and outputs the pixel signal to a vertical signal line 1013 installed for each column.

The vertical selection unit 1012 controls a row address and row scanning of the image capturing unit 1002 via a row control line 1011, when each unit pixel 1003 of the image capturing unit 1002 is driven. The horizontal selection unit 1014 controls a column address and column scanning of a column AD conversion unit 1016 of the column processing unit 1015. The reading current source unit 1005 is a current source that reads a pixel signal from the image capturing unit 1002 as a voltage signal. The analog unit 1006 performs amplification or the like, as necessary.

The column processing unit 1015 includes the column AD conversion unit 1016 (column unit) that includes a comparison unit 1109 and a latch unit 1108 for each column of the unit pixels 1003. A digital value output from the count unit 1018 is input to the ramp unit 1019. The ramp unit 1019 generates a ramp wave according to the input digital value and outputs the ramp wave as a reference signal to one of the input terminals of the comparison unit 1109. The output of the comparison unit 1109 is distributed to the latch unit 1108 of the respective columns. The pixel signal is input as an analog signal to be subjected to AD conversion from the unit pixel 1003 to the other of the input terminals of the comparison unit 1109 at each column in the column AD conversion unit 1016 via the vertical signal line 1013.

The horizontal selection unit 1014 controls a column address and column scanning of each AD conversion unit 1016 in the column processing unit 1015. Accordingly, digital data subjected to the AD conversion is sequentially output to the output unit 1017 via a horizontal signal line.

Next, a process in accordance with the first related art, and particularly, an AD conversion process will be described. First, the count unit 1018 starts counting in synchronization with a clock signal input from the control unit 1020. Simultaneously, the ramp unit 1019 starts generating the ramp wave. A common ramp wave of each column varying in synchronization with a pixel signal read from the unit pixel 1003 of each column and a count value of the count unit 1018 is input to the comparison unit 1109 of each column. In parallel with the ramp wave, the count value of the count unit 1018 is distributed to the latch unit 1108. When a magnitude relation between two input signals to the comparison unit 1109 of a given column is changed, the comparison output of the comparison unit 1109 is inverted and the latch unit 1108 of that row retains the count value. Through the above-described process, the pixel signal read from the pixel is subjected to the AD conversion, and thus a value (digital value) retained in the latch unit 1108 is obtained.

Here, the description of a specific process of the unit pixel will be omitted, but a reset level and a signal level are output from the unit pixel, as known in the related art. In order to acquire the digital value of a signal component (a difference signal between the reset level and the signal level) with high accuracy, the reset level and the signal level are required to be subjected to subtraction (CDS process) in a digital region. In the configuration of the first related art, in order to acquire the digital value of a signal component, the subtraction (CDS process) is performed using an arithmetic unit provided outside the column unit after the digital values of the reset level and the signal level are retained in the latch unit 1108 in the column unit.

Next, an image pickup device in accordance with Japanese Unexamined Patent Application, First Publication No. 2009-33297 will be described. The image pickup device in accordance with the second related art disclosed in Japanese Unexamined Patent Application, First Publication No. 2009-33297 is configured to further improve a resolution by setting a count value of the count unit 1018 as data of high-order bits and delays the phase of a clock (count clock) input to the count unit 1018 to generate a multi-phase clock and setting the logic state as data of low-order bits.

Here, an imager used in a digital still camera (DSC) will be considered as an example of a specific device. Specifically, a specification in which the number of pixels is 20 million and a frame rate is 60 frame/sec will be assumed. When it is assumed to facilitate the description that the pixel array of the 20 million pixels is 4000 rows×5000 columns and there is no blanking period for further simplification, a reading period of one row is as follows:

$$60 \text{ frame/sec} \times 4000 \text{ row/frame} = 240 \text{ Kline/sec.}$$

That is a reading rate of one row is 240 KHz. When this device is realized as the image pickup device in accordance with the first related art, in a case of AD conversion of 12 bits, $2^{12}$=4096 gray scales are required to be compared for the reading time of one row. Therefore, a count value of the count unit 1018 output to a digital memory is required to be changed at about 960 MHz which is about 4 thousand times the reading rate of one row.

In this calculation, a period, such as a standby time until an AD conversion circuit receives data from a pixel, in which a comparison process may not be performed as the AD conversion is not considered. Further, an OB (Optical Black) pixel period or the like is excluded in addition to the above period. Therefore, in practice, the frequency may be greater than the frequency estimated in the above-described way.

Next, when the above-described device is realized as the image pickup device in accordance with the second related art, the same calculation will be made. For example, on the assumption that 12 bits constitute 8 high-order bits and 4 low-order bits, it is sufficient for the count value of the count unit 1018 output to the digital memory to be changed at about 60 MHz which is 256 times the reading rate of one row. In regard to the low-order bits, digital values are acquired by delaying the phase of the clock (count clock) input to the count unit 1018 by 0, $\pi/16$, $\pi/8$, $3\pi/16$, $\pi/4$, $5\pi/16$, $3\pi/8$, $7\pi/16$, $\pi/2$, $9\pi/16$, $5\pi/8$, $11\pi/16$, $3\pi/4$, $13\pi/16$, $7\pi/8$, and $15\pi/16$, and retaining and encoding the logic states. Even in the configuration of the second related art, as in the first related art, the subtraction (CDS process) is required to be performed using an arithmetic unit provided outside the column unit, and thus encoding of the data of the low-order bits is required in addition to the subtraction (CDS process).

SUMMARY

The present invention provides an image pickup device capable of realizing a high speed and a high number of pixels.

According to a first aspect of the present invention, an image pickup device may include: an image capturing unit that includes a plurality of pixels arrayed in a matrix form and each outputting a first pixel signal according to a reset level and a second pixel signal according to a signal level; a reference signal generation unit that generates a reference signal increasing or decreasing over time; a comparison unit that is disposed for each column or each plurality of columns, compares analog signals to the reference signal, and ends the comparison process at a timing at which the reference signal satisfies a predetermined condition with respect to the analog signals; a clock generation unit that includes a delay circuit including a plurality of delay units connected to each other and outputs low-order phase signals configured with output signals of the plurality of delay units; a latch unit that is disposed for each column or each plurality of columns and retains the low-order phase signal as a latch signal at a timing related to the end of the comparison process; a count unit that is disposed for each column or each plurality of columns, counts a signal related to one of the low-order phase signals, and generates a high-order digital signal; a detection unit that is disposed for each column or each plurality of columns, and generates a low-order digital signal by sequentially comparing logic states of a plurality of bits of the latch signal retained by the corresponding latch unit and encoding the latch signal based on a comparison result of the logic states; and an arithmetic unit that is disposed for each column or each plurality of columns and performs an arithmetic process based on the high-order digital signal of the corresponding count unit and the low-order digital signal of the corresponding detection unit. The analog signals may be the first and second pixel signals. The count unit may generate a first high-order digital signal according to the first pixel signal and generate a second high-order digital signal according to the second pixel signal. The detection unit may generate a first low-order digital signal according to the first pixel signal and generate a second low-order digital signal according to the second pixel signal. The arithmetic unit may perform subtraction between first digital data related to the first high-order digital signal and the first low-order digital signal and second digital data related to the second high-order digital signal and the second low-order digital signal.

According to a second aspect of the present invention, in the image pickup device according to the first aspect, the delay circuit may include n delay units where n is an odd number equal to or greater than 3, and the delay circuit may be an oscillation circuit including a first path along which a signal is transmitted through the n delay units and a second path along which a signal is detoured around some of the n delay units to be transmitted.

According to a third aspect of the present invention, in the image pickup device according to the first or second aspect, the detection unit may include a detection circuit and an encoding circuit. The detection circuit may sequentially select and compare two latch signals output from two delay units and corresponding to the low-order phase signals among the latch signals retained by the corresponding latch unit, and the detection circuit may output a state change detection signal when detecting that the two latch signals are in a predetermined state. When an encoding signal having a state according to a combination of the two latch signals compared by the detection circuit is input and the state change detection signal is input, the encoding circuit may latch the encoding signal.

According to a fourth aspect of the present invention, in the image pickup device according to the first or second aspect, the arithmetic unit may include a counter circuit, and the counter circuit may perform the subtraction between the first digital data and the second digital data by setting an initial value based on a value of each of bits constituting the first digital data, and then sequentially counting a value of each of bits constituting the second digital data.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
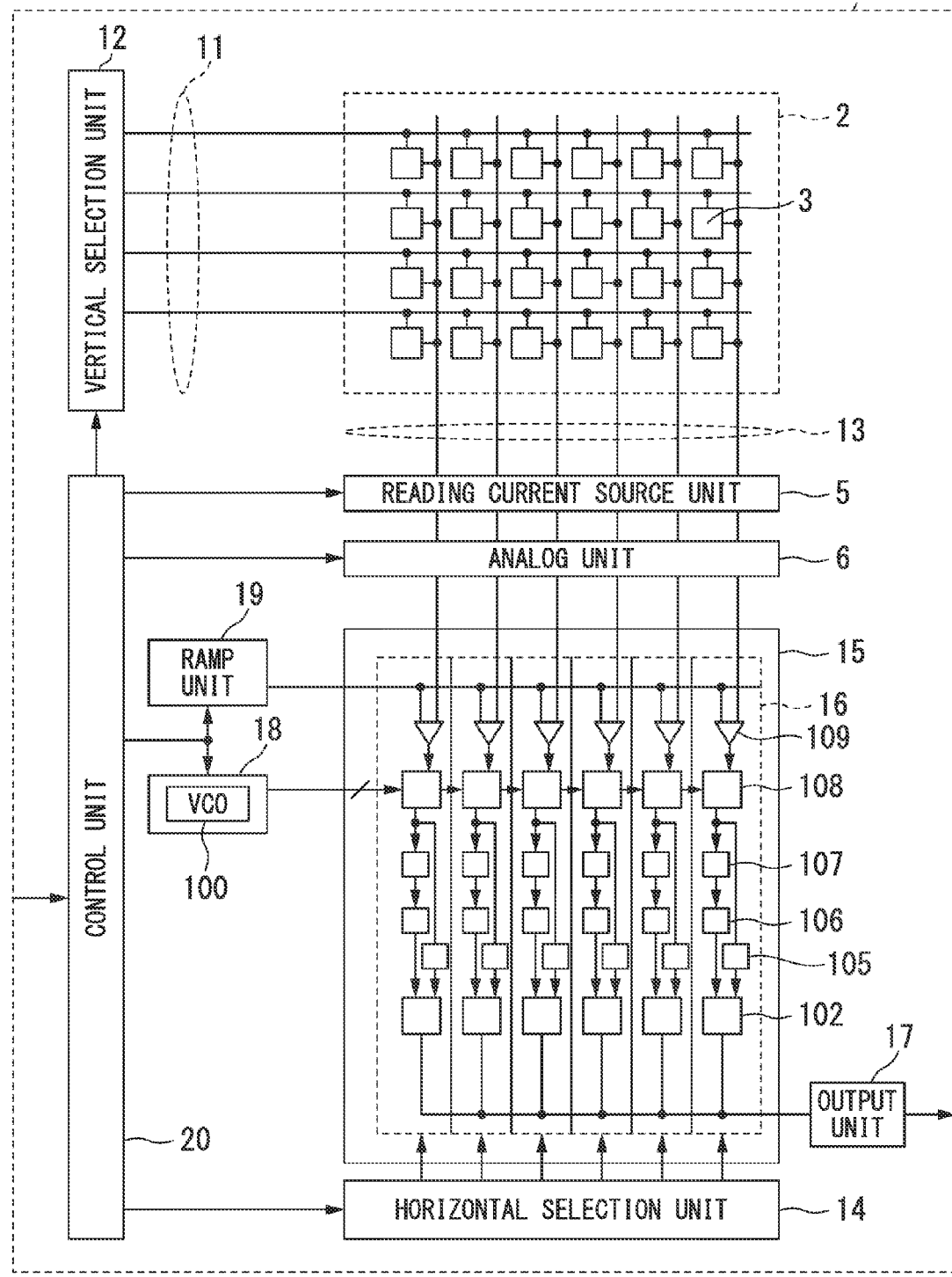
FIG. 1 is a block diagram illustrating the configuration of an image pickup device in accordance with a first preferred embodiment of the present invention.

A first preferred embodiment of the present invention will be described. FIG. 1 is a diagram illustrating an example of the configuration of a (C)MOS image pickup device in accordance with the first preferred embodiment of the present invention. An image pickup device 1 illustrated in FIG. 1 includes an image capturing unit 2, a vertical selection unit 12, a reading current source unit 5, a clock generation unit 18, a ramp unit 19 (reference signal generation unit), a column processing unit 15, a horizontal selection unit 14, an output unit 17, and a control unit 20.

In the image capturing unit 2, a plurality of unit pixels 3 that generate and output a signal according to the amount of an incident electromagnetic wave are arrayed in a matrix form. The vertical selection unit 12 selects each row of the image capturing unit 2. The reading current source unit 5 reads a signal from the image capturing unit 2 as a voltage signal. Although a detailed description is omitted here, the analog unit 6 includes an auto gain control (AGC) circuit that has a signal amplification function, as necessary.

The clock generation unit 18 generates and outputs a clock signal with a predetermined frequency. The ramp unit 19 generates a reference signal (ramp wave) increasing or decreasing over time. The column processing unit 15 is connected to the ramp unit 19 via a reference signal line. The horizontal selection unit 14 reads data subjected to AD conversion to a horizontal signal line. The output unit 17 is connected to the horizontal signal line. The control unit 20 controls each unit.

To facilitate the description in FIG. 1, a case in which the image capturing unit 2 includes the unit pixels 3 of 4 rows×6 columns will be described. In practice, however, several tens to several tens of thousands of unit pixels 3 are arrayed in each row and each column of the image capturing unit 2. Although not illustrated in the drawing, each unit pixel 3 of the image capturing unit 2 includes a photoelectric conversion element such as a photodiode, a photo gate, and a photo transistor and a transistor circuit.

Hereinafter, each unit will be described in detail. In the image capturing unit 2, the unit pixels 3 of 4 rows×6 columns are arrayed two-dimensionally and a row control line 11 is wired for each row in the pixel array of 4 rows×6 columns. One end of each of the row control lines 11 is connected to an output end of the vertical selection unit 12 corresponding to its row.

The vertical selection unit 12 includes a shift register or a decoder and controls a row address and row scanning of the image capturing unit 2 via the row control line 11 when the respective unit pixels 3 of the image capturing unit 2 are driven. A vertical signal line 13 is wired for each column in the pixel array of the image capturing unit 2.

The column processing unit 15 includes a column AD conversion unit 16 installed, for example, for each pixel column of the image capturing unit 2, that is, each vertical signal line 13, and converts an analog pixel signal read from each unit pixel 3 of the image capturing unit 2 via the vertical signal line 13 for each pixel column into digital data. In this example, the column AD conversion unit 16 is configured to have a one-to-one correspondence relation with the pixel column of the image capturing unit 2. However, this arrangement relation is merely an example and the present invention is not limited thereto. For example, one column AD conversion unit 16 may be disposed with respect to a plurality of pixel columns. The one column AD conversion unit 16 may be used among the plurality of pixel columns in a time-division manner. Along with the ramp unit 19 and the clock generation unit 18 to be described below, the column processing unit 15 forms an analog-digital conversion unit (AD conversion circuit) that converts an analog pixel signal read from the unit pixels 3 of a selected pixel row of the image capturing unit 2 into digital pixel data. The column AD conversion unit 16 includes a comparison unit 109, a latch unit 108, a count unit 105, a detection circuit 107, an encoding circuit 106, and an arithmetic unit 102. The column AD conversion unit 16 will be described in detail below.

The ramp unit 19 includes, for example, an integration circuit. The ramp unit 19 generates a so-called ramp wave of which a level varies in an inclination shape over time under the control of the control unit 20 and supplies the ramp wave to one input terminal of the comparison unit 109 via the reference signal line. The present invention is not limited to the case in which the integration circuit is used as the ramp unit 19, but a DAC circuit may be used. When a ramp wave is configured to be digitally generated by the DAC circuit, the step of the ramp wave is made minute. Alternatively, a configuration equivalent to the above configuration is required to be realized.

The horizontal selection unit 14 includes, for example, a shift register or a decoder and controls a column address and column scanning of the column AD conversion unit 16 of the column processing unit 15. Under the control of the horizontal selection unit 14, digital data subjected to the AD conversion by the column AD conversion unit 16 is sequentially read to the horizontal signal line.

The clock generation unit 18 includes a VCO 100 which is a delay circuit in which a plurality of delay units (inversion elements) are connected. For example, when the delay units of the VCO 100 are connected in 9 steps, the VCO 100 outputs 9-phase clocks CK0, CK1, CK2, CK3, CK4, CK5, CK6, CK7, and CK8. The signals output by the delay units form a low-order phase signal to be described below.

The output unit 17 outputs binarized digital data. The output unit 17 may have, for example, signal processing functions such as black level adjustment, column variation correction, or a color process as well as a buffering function. Further, n-bit parallel digital data may be converted into serial data and may be output.

The control unit 20 includes a function block of a timing generator (TG) that supplies a clock or a pulse signal of a predetermined timing necessary for a process of each unit such as the ramp unit 19, the clock generation unit 18, the vertical selection unit 12, the horizontal selection unit 14, and the output unit 17 and a function block that communicates with the TG.

Figure 2:
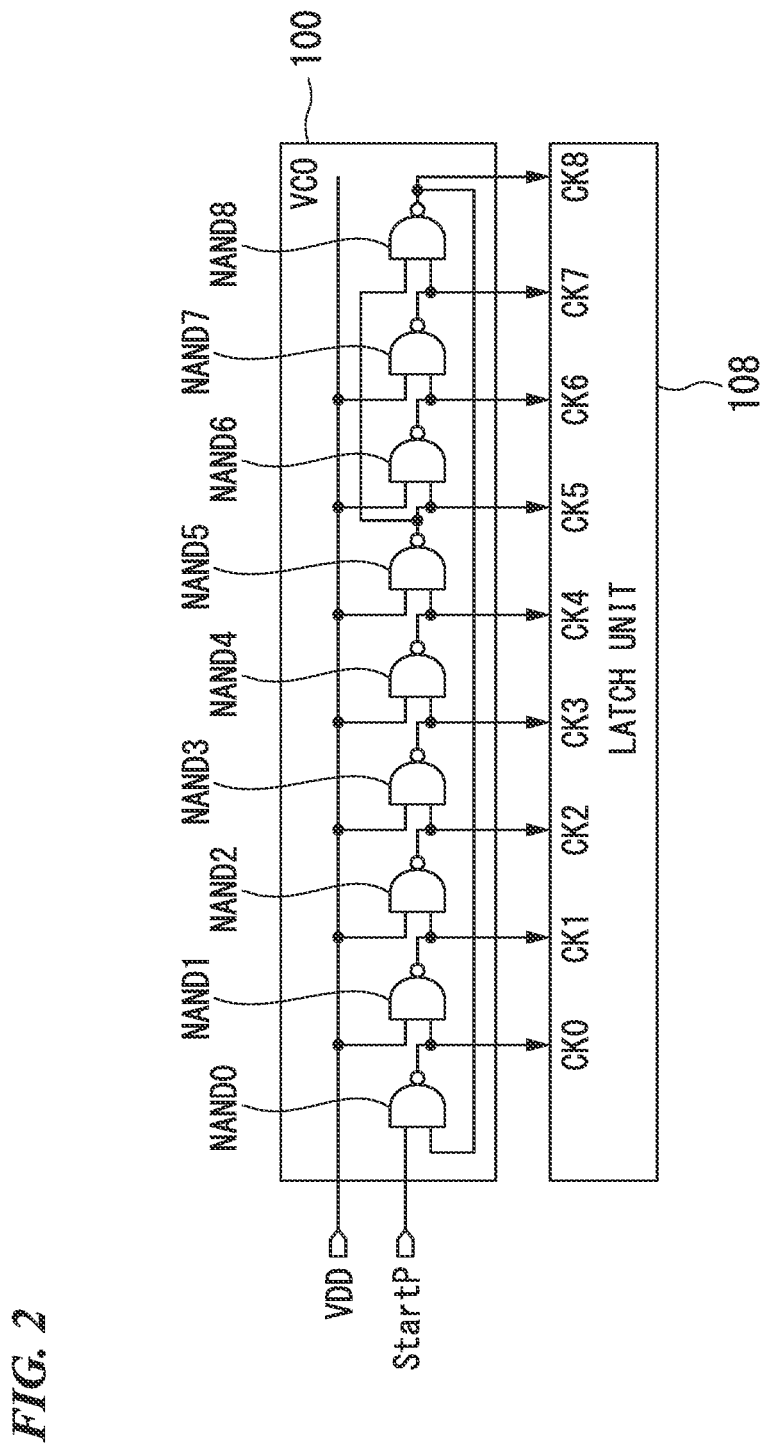
FIG. 2 is a block diagram illustrating the configuration of a VCO of a clock generation unit included in the image pickup device in accordance with the first preferred embodiment of the present invention.

Next, the configuration of the VCO 100 included in the clock generation unit 18 will be described. FIG. 2 is a diagram illustrating the configuration of the VCO 100. The VCO 100 includes an oscillation circuit in which 9 delay units (NAND circuits NAND0 to NAND8) are connected. In the first preferred embodiment, the number of NAND circuits of the VCO 100 may be an odd number equal to or greater than 5.

A start pulse StartP is input to one input terminal of the NAND circuit NAND0 of the VCO 100 and an output signal of the NAND circuit NAND8 is input to the other input terminal. A power voltage VDD is input to one input terminal of each of the NAND circuits NAND1 to NAND7 and an output signal of the NAND circuit at the previous stage is input to the other input terminal. During a process period of the AD conversion circuit, the power voltage VDD is set to have a high level. The output signal CK5 of the NAND circuit NAND5 is input to one input terminal of the NAND circuit NAND8 and the output signal CK7 of the NAND circuit NAND7 at the previous stage is input to the other input terminal. The output signal CK5 of the NAND circuit NAND5 is input not only to the NAND circuit NAND6 after one stage but also to the NAND circuit NAND8 after 3 stages.

A signal based on the start pulse StartP input to the NAND circuit NAND0 is transmitted along two kinds of paths and passes through the NAND circuits NAND0 to NAND8. The first path is a path along which a signal is transmitted through a signal line that connects the other input terminal of each NAND circuit to the output terminal of the NAND circuit at the previous stage. The second path is a path (detour path) along which a signal output from the NAND circuit NAND5 is transmitted through a signal line that connects the output terminal of the NAND circuit NAND5 to the input terminal of the NAND circuit NAND8. A signal transmitted along the second path does not pass through the NAND circuits NAND6 and NAND7 on the first path, but detours around the NAND circuits NAND6 and NAND7 and arrives at the NAND circuit NAND8. In the above-described configuration, a feedforward loop is formed and a so-called "asymmetric oscillation circuit" is formed.

By using the "asymmetric type oscillation circuit," power-of-two signals with phases different at a constant interval can be equivalently acquired from the oscillation circuit that includes odd delay units. Further, a so-called "fully differential type oscillation circuit" that includes even (in particular, power-of-two) delay units and is configured such that an output of the final state of a fully differential type inversion circuit forming the delay unit is fed back to the other input of the initial stage may be used. Furthermore, the present invention is not limited to this configuration.

Figure 3:
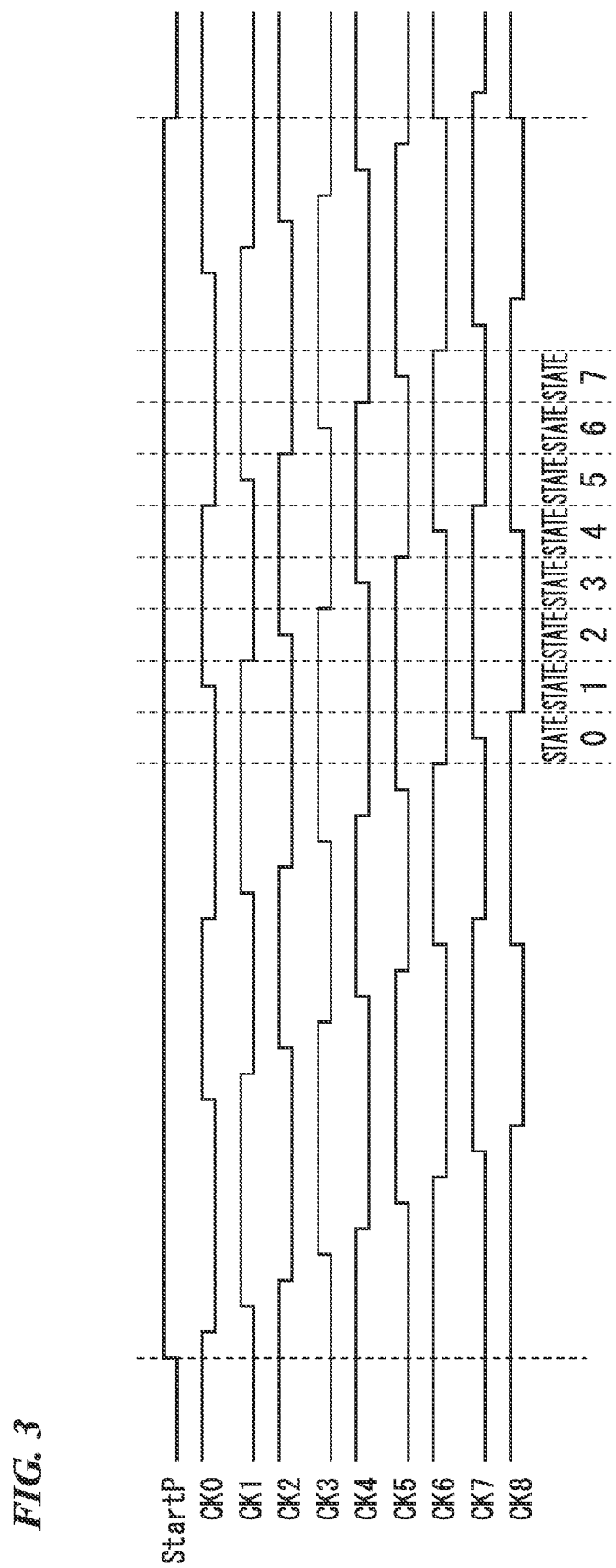
FIG. 3 is a timing chart illustrating a process of the VCO of the clock generation unit included in the image pickup device in accordance with the first preferred embodiment of the present invention.

Signals output from the NAND circuit NAND0 to NAND8 are output as low-order phase signals CK0 to CK8 to the latch unit 108 of the column AD conversion unit 16. FIG. 3 is a diagram illustrating the waveforms of the start pulse StartP and the low-order phase signals CK0 to CK8. The states (combinations of the logic states of the low-order phase signals CK0 to CK8) of the low-order phase signals CK0 to CK8 include, for example, total 8 states of state 0 to state 7. Data (low-order data) of the low-order bits constituting digital data can be acquired by encoding the low-order phase signals CK0 to CK8 in the 8 states to perform binarizing.

In this example, the count unit 105 included in the column AD conversion unit 16 counts the low-order phase signal CK6 as a count clock. When the count unit 105 counts the low-order phase signals CK6 at the falling edge of the low-order phase signal CK6, combinations of the logic states of the low-order phase signals CK0 to CK8 during 8 periods divided from a period (a period from the falling edge of the low-order phase signal CK6 to the subsequent falling edge thereof) in which the count unit 105 performs one count are state 0 to state 7. In FIG. 2, the low-order phase signals CK0 to CK8 are input to the latch unit 108. However, as will be described below, the detection circuit 107 uses the low-order phase signals other than the low-order phase signal CK0. Therefore, the low-order phase signal CK0 may not be input to the latch unit 108.

Next, the configuration of the column AD conversion unit 16 will be described. Each column AD conversion unit 16 generates a pulse signal with a magnitude (pulse width) of a time axis direction corresponding to each magnitude of the reset level (reference level) or the signal level by comparing the analog pixel signal read from each unit pixel 3 of the image capturing unit 2 via the vertical signal line 13 to the ramp wave which is supplied from the ramp unit 19 and is to be the AD conversion. Then, the AD conversion is performed by converting data corresponding to the period of the pulse width of the pulse signal into digital data according to the magnitude of the pixel signal.

Figure 4:
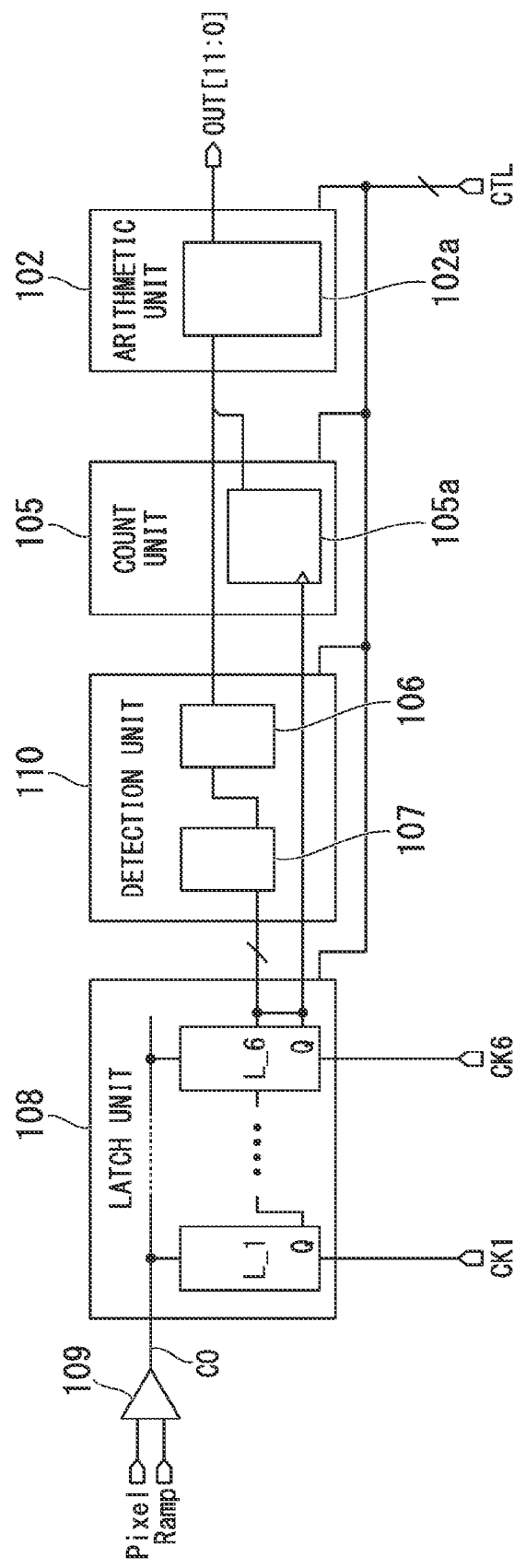
FIG. 4 is a block diagram illustrating the configuration of a column AD conversion unit included in the image pickup device in accordance with the first preferred embodiment of the present invention.

Next, the configuration of the column AD conversion unit 16 will be described in detail. The column AD conversion unit 16 is installed for each column. In FIG. 1, 6 column AD conversion units 16 are thus installed. The column AD conversion unit 16 of each column has the same configuration. FIG. 4 is a diagram illustrating the configuration of the column AD conversion unit 16. As illustrated in FIG. 4, the column AD conversion unit 16 includes the comparison unit 109, the latch unit 108, the count unit 105, the detection circuit 107, the encoding circuit 106, and the arithmetic unit 102.

The comparison unit 109 converts the magnitude of an analog pixel signal Pixel from the unit pixel 3 of the image capturing unit 2 output via the vertical signal line 13 into information (the pulse width of a pulse signal) in a time axis direction by comparing the signal voltage according to the pixel signal Pixel to a ramp voltage of a ramp wave Ramp supplied from the ramp unit 19. A comparison output CO of the comparison unit 109 is in a High level (H level), for example, when the ramp voltage is greater than the signal voltage. The comparison output CO is in a Low level (L level), when the ramp voltage is equal to or less than the signal voltage.

The latch unit 108 includes latch circuits L_1 to L_8 that latch (retain/store) the low-order phase signals CK1 to CK8 output from the VCO 100. The latch unit 108 outputs one (in this example, the low-order phase signal CK6) of the low-order phase signals output from the VCO 100 to the count unit 105 without change, until the comparison output CO of the comparison unit 109 is inverted. The latch unit 108 latches the low-order phase signals CK1 to CK8 output from the VCO 100 at an inversion timing of the comparison output CO of the comparison unit 109.

The count unit 105 includes a counting counter circuit 105a that performs a counting process based on one low-order phase signal (in this example, the low-order phase signal CK6) output via the latch unit 108. When the count unit 105 performs the counting, data (high-order data) of the high-order bits constituting the digital data can be obtained. The count values of the counting counter circuit 105a are output as output signals DO[3] to DO[5]. For example, an asynchronous counter (ripple counter) that has an up-count mode is very suitable as the counting counter circuit 105a, but the present invention is not limited thereto.

The detection circuit 107 detects a thermometer code (a changed position of the logic state of the lower-order phase signal) by sequentially comparing two of the low-order phase signals latched by the latch circuits L_1 to L_8 of the latch unit 108, and then outputs the detection result. The encoding circuit 106 performs encoding based on the detection result output from the detection circuit 107 and confirms an encoding value. Thus, the low-order phase signals are binarized. The detection circuit 107 and the encoding circuit 106 form a detection unit 110. A thermometer code detection method performed by the detection circuit 107 and an encoding method performed by the encoding circuit 106 will be described below.

The arithmetic unit 102 includes an arithmetic counter circuit 102a that performs subtraction (CDS process). After a digital value retained by the encoding circuit 106 and the count unit 105 is set as an initial value of the arithmetic counter circuit 102a through encoding of a first pixel signal, a counting process is performed based on the digital value retained by the encoding circuit 106 and the count unit 105 through encoding of a second pixel signal by the arithmetic counter circuit 102a. In this way, the subtraction (CDS process) is performed.

Next, a process of this example will be described. Although the description of a specific process of the unit pixel 3 is omitted, a reset level and a signal level are output from the unit pixel 3, as known in the related art.

The AD conversion is performed as follows. For example, the digital data corresponding to each magnitude of the reset level or the signal level is obtained by comparing the ramp wave falling at a predetermined inclination to the voltage of the reset level or the signal level which is the pixel signal from the unit pixel 3, causing the count unit 105 to count the low-order phase signals output via the latch unit 108 during a period from the time of the generation of the ramp wave used in the comparison process to the time of accordance between the voltage of the reset level or the signal level and the ramp wave (ramp voltage), causing the detection circuit 107 to detect the thermometer code based on the logic state of the low-order phase signals latched by the latch unit 108, and causing the encoding circuit 106 to encode the detection result.

Here, as a first reading process, the reset level containing noise of the pixel signal is read as an analog pixel signal from each unit pixel 3 of a selected row of the image capturing unit 2. Thereafter, as a second reading process, the signal level is read. Then, the reset level and the signal level are input chronologically to the column AD conversion unit 16 via the vertical signal line 13. Further, the signal level may be read as the first reading process, and then the reset level may be read as the second reading process. The first reading process, the second reading process, the encoding (binarizing process), and the subtraction (CDS process) will be described in detail below. Here, a count mode of the counting counter circuit 105a of the count unit 105 is assumed to be an up-count mode and a count mode of the arithmetic counter circuit 102a of the arithmetic unit 102 is assumed to be a down-count mode.

(First Reading Process)

After the first reading process from the unit pixels 3 of any pixel row to the vertical signal lines 13 is stabilized, the control unit 20 supplies control data used to generate the ramp wave to the ramp unit 19. The ramp unit 19 receives the control data and outputs a ramp wave of which a waveform overall temporally varies in a ramp shape as a comparison voltage given to one input terminal of the comparison unit 109. The comparison unit 109 compares the ramp wave to the reset level. Meanwhile, the count unit 105 performs the counting using, as a count clock, one (in this example, the low-order phase signal CK6) of the low-order phase signals output from the clock generation unit 18 and output via the latch unit 108. Further, an output start timing of the low-order phase signal of the clock generation unit 18 is preferably substantially identical with an output start timing of the ramp wave, but the present invention is not limited thereto.

The comparison unit 109 compares the ramp wave given from the ramp unit 19 to the reset level and inverts the comparison output when the voltages of the ramp wave and the reset level substantially accord with each other (first timing). At the first timing, the latch unit 108 retains the low-order phase signals CK1 to CK8 output from the clock generation unit 18. The count unit 105 retains the count result as a first high-order count value. When a predetermined period elapses, the control unit 20 stops supplying the control data to the ramp unit 19 and stops outputting the low-order phase signals from the clock generation unit 18. Thus, the ramp unit 19 stops generating the ramp wave.

Subsequently, the low-order phase signals CK1 to CK8 retained by the latch unit 108 are encoded and the encoding values are retained in the encoding circuit 106. Further, each bit constituting first digital data formed from the encoding values retained in the encoding circuit 106 and the first high-order count value retained in the count unit 105 is set in a bit of the arithmetic counter circuit 102a of the arithmetic unit 102. Thereafter, the value of each bit retained by the arithmetic counter circuit 102a is inverted. Thus, an initial value of the arithmetic counter circuit 102a is set for the second reading process.

(Second Reading Process)

Subsequently, at the time of the second reading process, a signal level according to an amount of incident light of each unit pixel 3 is read and the same process as the first reading process is performed. After the second reading process from the unit pixels 3 of any pixel row to the vertical signal lines 13 is stabilized, the control unit 20 supplies control data used to generate the ramp wave to the ramp unit 19. The ramp unit 19 receives the control data and outputs a ramp wave of which a waveform overall temporally varies in a ramp shape as a comparison voltage given to one input terminal of the comparison unit 109. The comparison unit 109 compares the ramp wave to the signal level. Meanwhile, the count unit 105 performs the counting using, as a count clock, one (in this example, the low-order phase signal CK6) of the low-order phase signals output from the clock generation unit 18 and output via the latch unit 108. Further, an output start timing of the low-order phase signal of the clock generation unit 18 is preferably substantially identical with an output start timing of the ramp wave, but the present invention is not limited thereto.

The comparison unit 109 compares the ramp wave given from the ramp unit 19 to the signal level and inverts the comparison output when the voltages of the ramp wave and the reset level substantially accord with each other (second timing). At the second timing, the latch unit 108 retains the low-order phase signals CK1 to CK8 output from the clock generation unit 18. The count unit 105 retains the count result as a second high-order count value. When a predetermined period elapses, the control unit 20 stops supplying the control data to the ramp unit 19 and stops outputting the low-order phase signals from the clock generation unit 18. Thus, the ramp unit 19 stops generating the ramp wave.

Subsequently, the low-order phase signals CK1 to CK8 retained by the latch unit 108 are encoded and the encoding values are retained in the encoding circuit 106. Further, based on the value of each bit constituting second digital data formed from the encoding values retained in the encoding circuit 106 and the second high-order count value retained in the count unit 105, the arithmetic counter circuit 102a of the arithmetic unit 102 performs the subtraction.

Thus, the arithmetic counter circuit 102a performs the subtraction (CDS process) between the first digital data based on the reset level and the second digital data based on the signal level.

Accordingly, digital data according to a difference between the reset level and the signal level can be obtained. Finally, the value of each bit constituting the digital data retained by the arithmetic counter circuit 102a of the arithmetic unit 102 is inverted, and the inverted digital data is transmitted to the output unit 17 via the horizontal signal line by the horizontal selection unit 14. The inverting of the digital data at the time of the second reading process may be performed even after the digital data is transmitted to the output unit 17. Through the above-described process, it is possible to obtain the digital data according to a difference between the first pixel signal and the second pixel signal.

Figure 5:
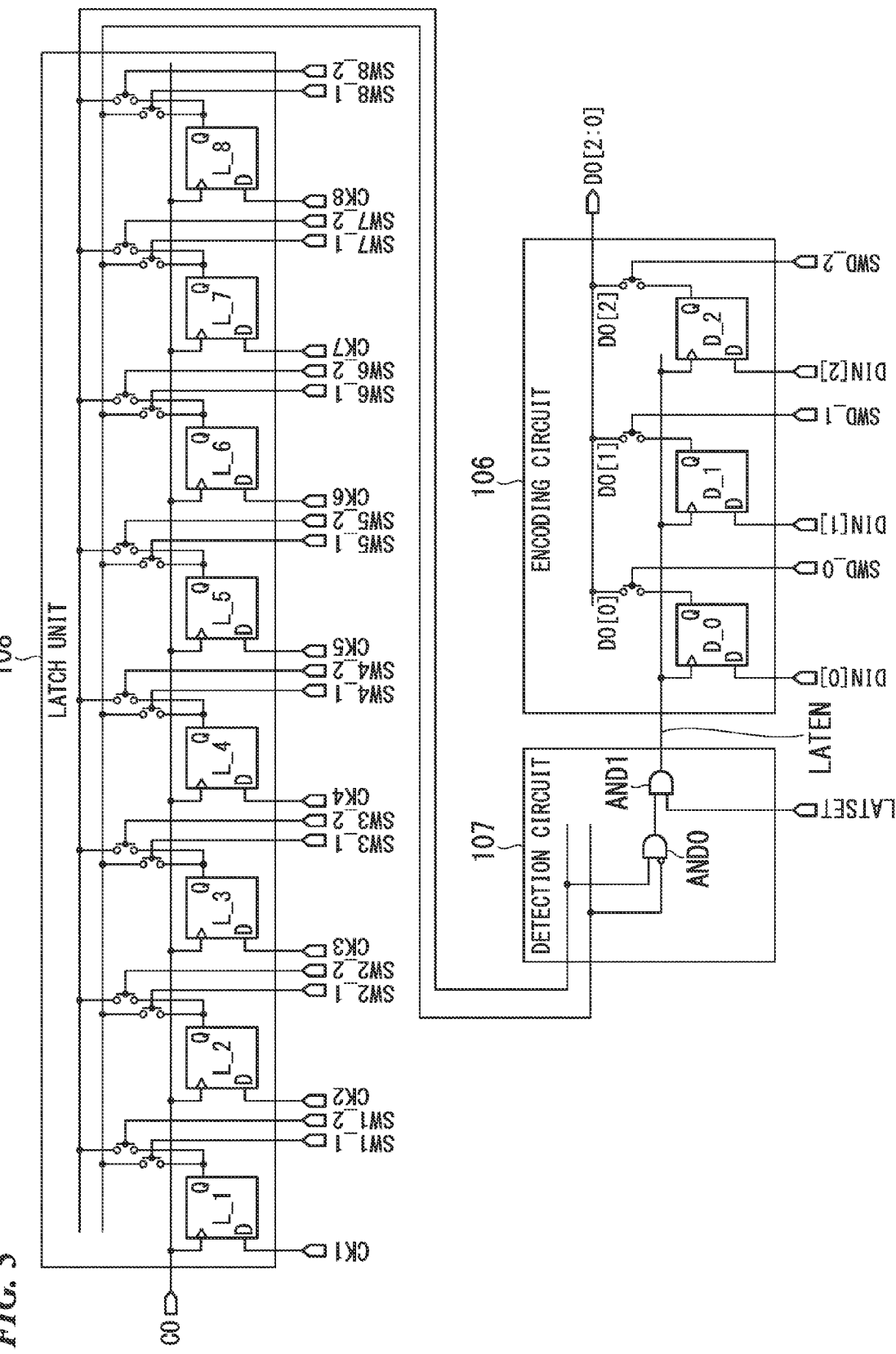
FIG. 5 is a circuit diagram illustrating the configurations of a latch unit, a detection circuit, and an encoding circuit of the column AD conversion unit included in the image pickup device in accordance with the first preferred embodiment of the present invention.

Next, the latch unit 108, the detection circuit 107, and the encoding circuit 106 will be described in detail. FIG. 5 is a diagram illustrating the configurations of the latch unit 108, the detection circuit 107, and the encoding circuit 106.

The latch unit 108 includes the latch circuits L_1 to L_8 that latch the logic states of the low-order phase signals CK1 to CK8 when the comparison output CO from the comparison unit 109 is inverted. As described above, the detection circuit 107 detects the thermometer code using the output signal other than the low-order phase signal CK0. Therefore, in FIG. 5, the latch unit 107 does not include the latch circuit L_0 that latches the low-order phase signal CK0. Control signals SW 1_1 to SW8_1 and control signals SW1_2 to SW8_2 are signals used to control switches that output desired low-order phase signals among the low-order phase signals CK1 to CK8 latched by the latch circuits L_1 to L_8 to the detection circuit 107.

The detection circuit 107 includes AND circuits AND0 and AND1. The low-order phase signal output from one of the latch circuits L_1 to L_8 and a signal inverted from the low-order phase signal output from another of the latch circuits L_1 to L_8 are input to the AND circuit AND0. The AND circuit AND0 performs an AND operation on the two input signals. An output signal of the AND circuit AND0 and a control signal LATSET are input to the AND circuit AND1. The AND circuit AND1 performs an AND operation on the two input signals and outputs the result as a detection result LATEN of the thermometer code.

The encoding circuit 106 includes encoding latch circuits D_0 to D_2. Encoding values DIN[0] to DIN[2] are sequentially changed according to a combination of two low-order phase signals sequentially compared by the detection circuit 107. Whenever the combination of the two low-order phase signals input to the detection circuit 107 is changed, the encoding values DIN[0] to DIN[2] input to the encoding circuit 106 are changed. The encoding values DIN[0] to DIN [2] at the time of the detection of the thermometer code are retained as encoding results of the low-order phase signals CK1 to CK8 and are output as output signals DO[0] to DO[2]. Control signals SWD_0 to SWD_2 are signals used to control switches that output encoding values from the latch circuits D_0 to D_2.

Figure 6:
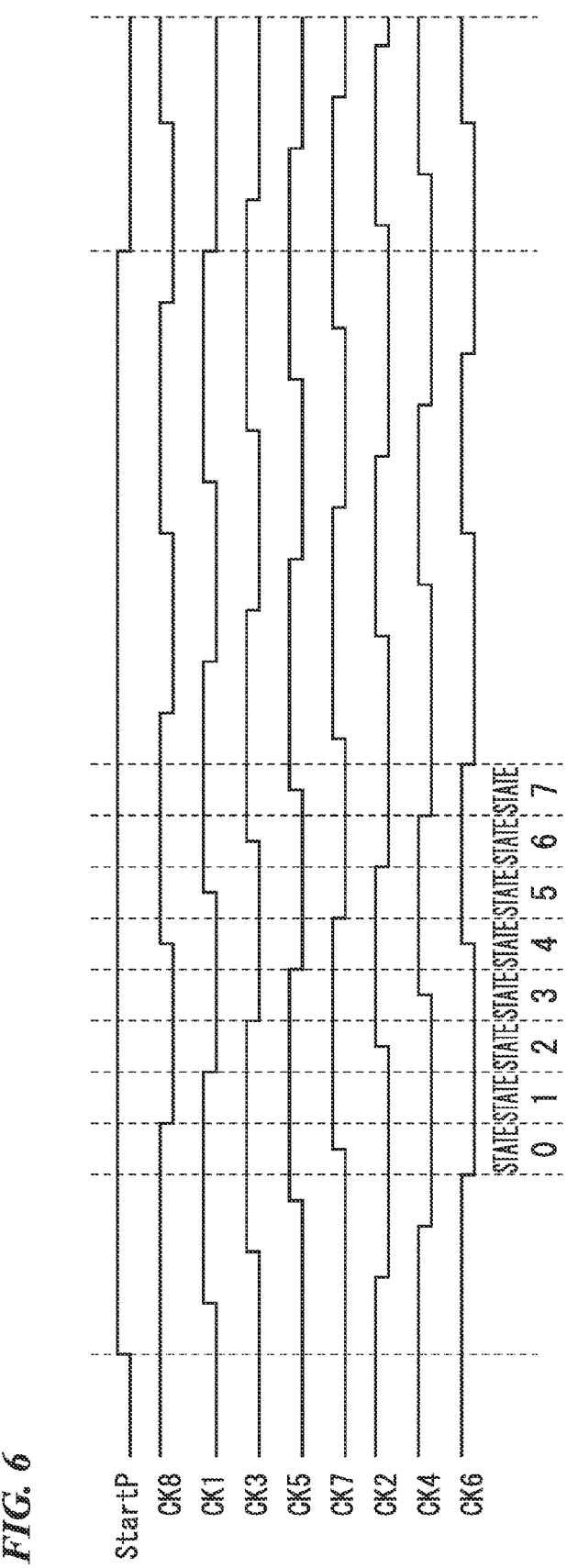
FIG. 6 is a timing chart illustrating a detection sequence of a thermometer code in the image pickup device in accordance with the first preferred embodiment of the present invention.

Next, processes of the detection circuit 107 and the encoding circuit 106 will be described. FIG. 6 is a timing chart illustrating a detection sequence of the thermometer code. In FIG. 6, the low-order phase signals CK0 to CK8 illustrated in FIG. 3 are arranged as a signal group falling (changed from the H state to the L state) sequentially at a predetermined time interval. Specifically, the low-order phase signals are arranged in the order of the low-order phase signals CK8, CK1, CK3, CK5, CK7, CK2, CK4, and CK6. As illustrated in FIG. 6, when the low-order phase signal CK8 is changed from the H state to the L state and then a predetermined time (corresponding to a delay time of two NAND circuits) elapses, the low-order phase signal CK1 is changed from the H state to the L state. When the low-order phase signal CK1 is changed from the H state to the L state and then the predetermined time (corresponding to a delay time of two NAND circuits) elapses, the low-order phase signal CK3 is changed from the H state to the L state. Thereafter, the low-order phase signals CK5, CK7, CK2, CK4, and CK6 are sequentially changed from the H state to the L state.

The encoding of the low-order phase signals is performed using, for example, the low-order phase signals other than the low-order phase signal CK0. Specifically, the encoding is performed by chronologically performing <sequence (1)> to <sequence (7)> to be described below. In each sequence, the change position of the logic state from the L state to the H state in the signal group (signal line) in which the low-order phase signals CK8, CK1, CK3, CK5, CK7, CK2, CK4, and CK6 latched by the latch unit 108 are arranged in this order, that is, the thermometer code is detected. The state is determined according to the detected thermometer code. The change in the logic state from the L state to the H state means that the low-order phase signal on the front side is in the L state and the low-order phase signal on the rear side is in the H state when the respective low-order phase signals of the above-described signal group are sequentially viewed.

For example, in the case of state 7, the logic state is changed from the L state to the H state between the low-order phase signals CK4 and CK6 when the logic states of the low-order phase signals CK8, CK1, CK3, CK5, CK7, CK2, CK4, and CK6 are sequentially viewed. Even in other states 0 to 6, the logic state is changed from the L state to the H state between two low-order phase signals according to each state. That is, the state can be determined by detecting the change positions of the logic states of the low-order phase signals arranged as in FIG. 6.

Hereinafter, each sequence will be described.
(Sequence 1: To determine whether a state is "state 7")
When the logic states of the low-order phase signals CK6 and CK4 are compared to each other and the thermometer code is present here, the state is determined to be "state 7."
(Sequence 2: To determine whether a state is "state 6")
When the logic states of the low-order phase signals CK4 and CK2 are compared to each other and the thermometer code is present here, the state is determined to be "state 6."
(Sequence 3: To determine whether a state is "state 5")
When the logic states of the low-order phase signals CK2 and CK7 are compared to each other and the thermometer code is present here, the state is determined to be "state 5."
(Sequence 4: To determine whether a state is "state 4")
When the logic states of the low-order phase signals CK7 and CK5 are compared to each other and the thermometer code is present here, the state is determined to be "state 4."
(Sequence 5: To determine whether a state is "state 3")
When the logic states of the low-order phase signals CK5 and CK3 are compared to each other and the thermometer code is present here, the state is determined to be "state 3."
(Sequence 6: To determine whether a state is "state 2")
When the logic states of the low-order phase signals CK3 and CK1 are compared to each other and the thermometer code is present here, the state is determined to be "state 2."
(Sequence 7: To determine whether a state is "state 1")
When the logic states of the low-order phase signals CK1 and CK8 are compared to each other and the thermometer code is present here, the state is determined to be "state 1."

When it is determined that the state is not any one of "state 7" to "state 1" from Sequence 1 to Sequence 7, the state is "state 0." Therefore, it is not particularly necessary to determine whether the state is "state 0." In order for the detection circuit 107 to detect the thermometer code, control signals SW*_1 (*: 1 to 8) and control signals SW*_2 (*: 1 to 8) are controlled such that the above-described encoding sequences are realized. As illustrated in FIG. 6, the circuit detecting the thermometer code can be realized with a simple circuit configuration by detecting the change position of the logic state of each signal after the arrangement of the low-order phase signals CK0 to CK8.

Figure 7:
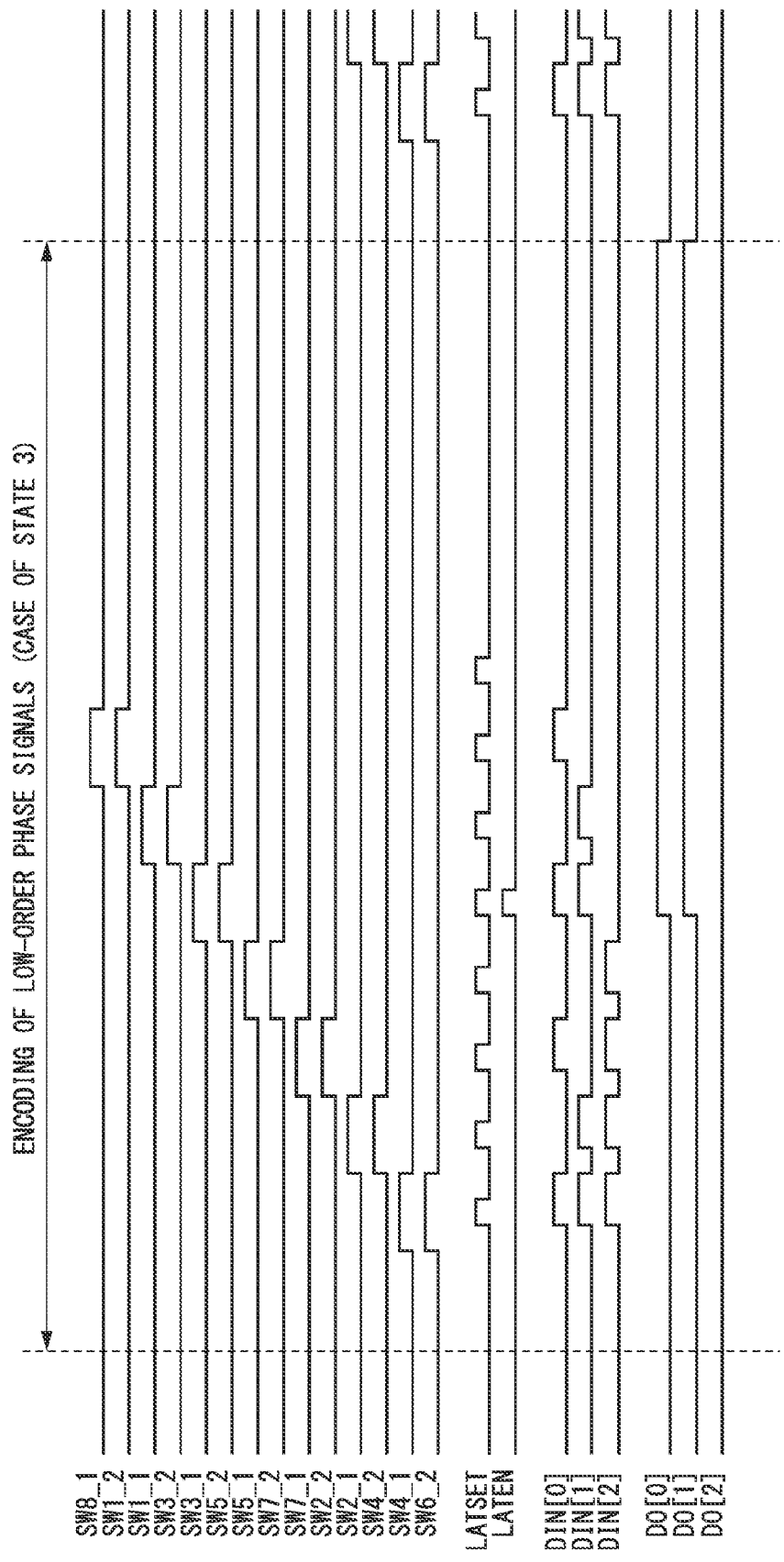
FIG. 7 is a timing chart illustrating processes of the detection circuit and the encoding circuit of the column AD conversion unit included in the image pickup device in accordance with the first preferred embodiment of the present invention.

FIG. 7 is a diagram illustrating the waveform of each signal relevant to the processes of the detection circuit 107 and the encoding circuit 106. Hereinafter, a case in which the state of the low-order phase signals CK0 to CK8 retained by the latch unit 108 is "state 3" is an exemplary example.

First, an overview of a process will be described. The low-order phase signals are input from the latch circuit selected from the latch circuits L_1 to L_8 retaining the low-order phase signals CK1 to CK8 to the detection circuit 107 by the control signals SW 1_1 to SW8_1 and the control signals SW1_2 to SW8_2, and thus the thermometer code (in this example, an edge position changed from the H state to the L state) is detected based on the input low-order phase signal. The thermometer code is detected when the result of the AND operation of the low-order phase signal CK* (where * is any one of 1 to 8) output from the latch circuit L_* (where * is any one of 1 to 8) and a signal inverted from the low-order phase signal CK* (where * is any one of 1 to 8) is in the H state.

Further, the encoding values DIN[0] to DIN[2] at the time of the detection of the thermometer code are set to the encoding results.

Hereinafter, detailed processes corresponding to Sequence 1 to Sequence 7 described above will be described. By changing the comparison output CO of the comparison unit 109 at a timing at which a predetermined condition is satisfied, the logic states of the low-order phase signals CK1 to CK8 output from the VCO 100 are retained in the latch unit 108. Subsequently, the control signals SW*_1 (where *: 1 to 8) and the control signals SW*_2 (where *: 1 to 8) enter the H state in a predetermined order.
(Sequence 1)
When the control signals SW6_2 and SW4_1 enter the H state, the low-order phase signal CK6 (the L state) retained in the latch circuit L_6 is input to the AND circuit AND0 and a signal inverted from the low-order phase signal CK4 (the H state or the L state) retained in the latch circuit L_4 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. At this time, an output signal DO [2:0] of the encoding circuit 106 is 3'b000. Here, "3'b" indicates that the output signal is 3-bit binary numbers and "000" indicates an output of the latch circuits D_0 to D_2 of the encoding circuit 106.
(Sequence 2)
Next, when the control signals SW4_2 and SW2_1 enter the H state, the low-order phase signal CK4 (the H state or the L state) retained in the latch circuit L_4 is input to the AND circuit AND0 and a signal inverted from the low-order phase signal CK2 (the H state) retained in the latch circuit L_2 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. At this time, an output signal DO [2:0] of the encoding circuit 106 is 3'b000.
(Sequence 3)
Next, when the control signals SW2_2 and SW7_1 enter the H state, the low-order phase signal CK2 (the H state) retained in the latch circuit L_2 is input to the AND circuit AND0 and a signal inverted from the low-order phase signal CK7 (the H state) retained in the latch circuit L_7 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. At this time, an output signal DO [2:0] of the encoding circuit 106 is 3'b000.
(Sequence 4)
Next, when the control signals SW7_2 and SW5_1 enter the H state, the low-order phase signal CK7 (the H state) retained in the latch circuit L_7 is input to the AND circuit AND0 and a signal inverted from the low-order phase signal CK5 (the H state) retained in the latch circuit L_5 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. At this time, an output signal DO [2:0] of the encoding circuit 106 is 3'b000.

(Sequence 5)

Next, when the control signals SW5_2 and SW3_1 enter the H state, the low-order phase signal CK5 (the H state) retained in the latch circuit L_5 is input to the AND circuit AND0 and a signal inverted from the low-order phase signal CK3 (the L state) retained in the latch circuit L_3 is input to the AND circuit AND0. Thus, the output signal of the AND circuit AND0 enters the H state. Thereafter, after the control signal LATSET is changed from the L state to the H state, the control signal LATSET enters the L state. Thus, after the detection result LATEN is changed from the L state to the H state, the detection result LATEN enters the L state and an encoding signal DIN [2:0]=3′b011 at this time is retained in the encoding circuit 106. At this time, an output signal DO [2:0] of the encoding circuit 106 is 3′b011.

(Sequence 6)

Next, when the control signals SW3_2 and SW1_1 enter the H state, the low-order phase signal CK3 (the L state) retained in the latch circuit L_3 is input to the AND circuit AND0 and a signal inverted from the low-order phase signal CK1 (the L state) retained in the latch circuit L_1 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. At this time, an output signal DO [2:0] of the encoding circuit 106 is 3′b011.

(Sequence 7)

Next, when the control signals SW1_2 and SW8_1 enter the H state, the low-order phase signal CK1 (the L state) retained in the latch circuit L_1 is input to the AND circuit AND0 and a signal inverted from the low-order phase signal CK8 (the L state) retained in the latch circuit L_8 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. At this time, an output signal DO [2:0] of the encoding circuit 106 is 3′b011.

Figure 8:
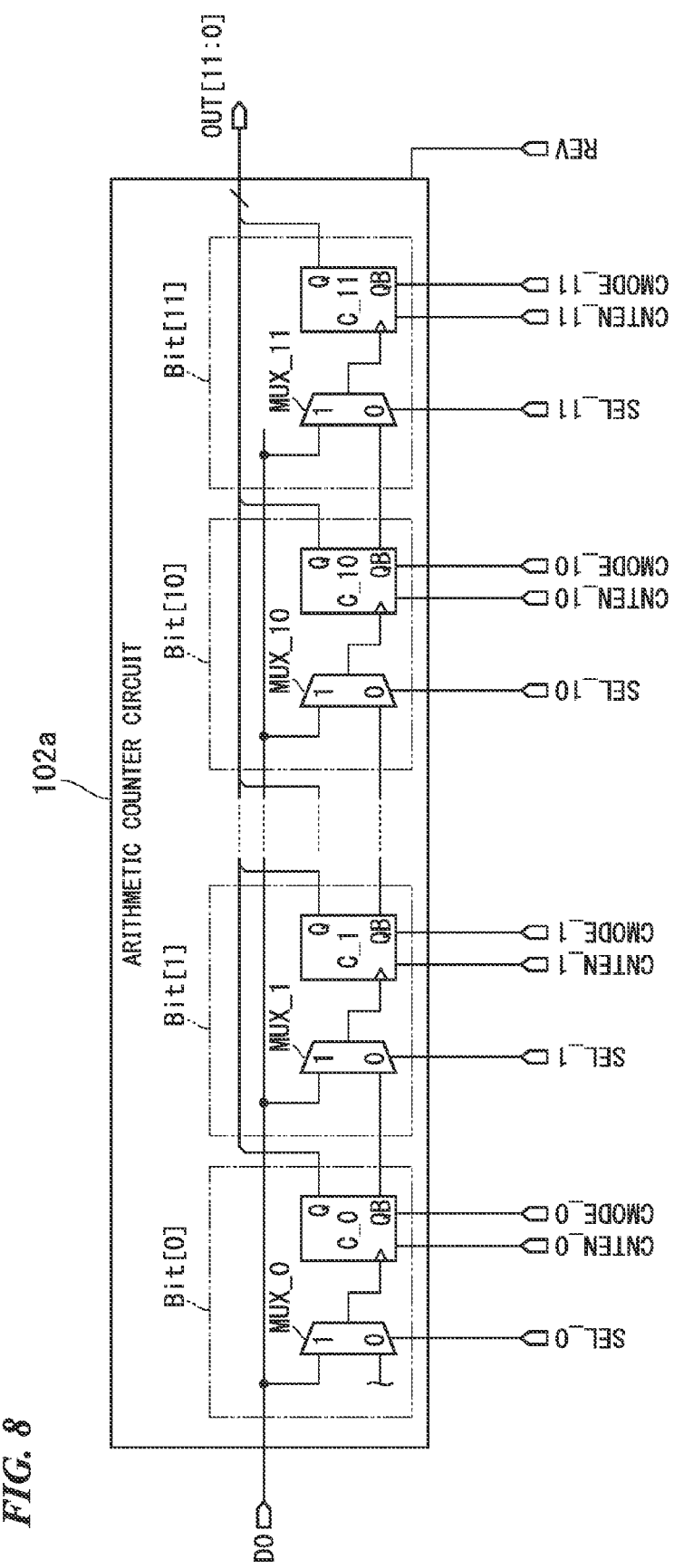
FIG. 8 is a circuit diagram illustrating the configuration of an arithmetic unit of the column AD conversion unit included in the image pickup device in accordance with the first preferred embodiment of the present invention.

Thereafter, the control signals SW1_2 and SW8_1 enter the L state. The encoding value (DO [2:0]=3′b011) corresponding to "state 3" is confirmed through the above-described processes Next, the arithmetic unit 102 will be described in detail. FIG. 8 is a diagram illustrating the configuration of the arithmetic counter circuit 102a of the arithmetic unit 102.

Bits Bit[0] to Bit[11] forming the arithmetic counter circuit 102a include changeover units MUX_0 to MUX_11 and counters C_0 to C_11. The changeover units MUX_0 to MUX_11 switch signals input to the counters C_0 to C_11. Specifically, the changeover unit MUX_0 switches a signal input as a count clock to the counter C_0 between an output signal of the count unit 105 or the detection unit 110 and a DC potential (for example, a ground GND). The changeover units MUX_1 to MUX_11 switch signals input as count clocks to the counters C_1 to C_11 between the output signal of the count unit 105 or the detection unit 110 and output signals of the counters C_0 to C_10 of the previous stages.

Control signals SEL_0 to SEL_11 used to switch a signal are input to the changeover units MUX_0 to MUX_11. When the control signals SEL_0 to SEL_11 are set to the H state, the output signal of the count unit 105 or the detection unit 110 is input to the counters C_0 to C_11. When the control signal SEL_0 is set to the L state, the DC potential is input to the counter C_0. When the control signals SEL_1 to SEL11 are set to the L state, the output signals of the counters C_0 to C_10 of the previous stages are input to the counters C_1 to C_11.

Control signals CNTEN_0 to CNTEN_11, control signals CMODE_0 to CMODE_11, and a control signal REV are input to the counters C_0 to C_11. The control signals CNTEN_0 to CNTEN_11 are signals used to set values retained in the count unit 105 and the detection unit 110 in the counters C_0 to C_11. The control signals CMODE_0 to CMODE_11 are signals used to switch processes of the counters C_0 to C_11 between a count mode and a data protection mode. The control signal REV is a signal used to toggle (invert) data of the counters C_0 to C_11. In this example, the arithmetic counter circuit 102a may include a flag counter that determines positive/negative. The counters C_0 to C_11 will be described in detail below with reference to FIG. 13.

Next, a specific example of the process of the arithmetic unit 102 in accordance with this example will be described. To facilitate the description, a case in which a down-counter is used as the arithmetic counter circuit 102a will be described. Here, the process will be described focusing on 6-bit counters C_0 to C_5 among the counters C_0 to C_11 forming the arithmetic counter circuit 102a. When the counting is performed in a down count mode, the count value is 6′b00_0000 (corresponding to 0) in a case of, for example, 0 count and the count value is 6′b11_1001 (corresponding to −7) in a case of, for example, 7 count.

The notation of the above count values will be described. Here, "6′b" indicates that the count value is 6-bit binary numbers. Further, "00_0000" indicates an output of the arithmetic counter circuit 102a (the counters C_0 to C_5).

Next, an example of the subtraction (CDS process) between the first digital data based on the pixel signal with the reset level and the second digital data based on the pixel signal with the signal level subsequent to the reset level will be described. In this example, binary subtraction is performed using the complement of two. On the assumption that A is the digital value of the first digital data and B is the digital value of the second digital data, the arithmetic result is B−A. The subtraction result, B−A, can be obtained by setting the digital value A of the first digital data as the initial value of the arithmetic counter circuit 102a, subtracting the digital value B of the second digital data, and then inverting the sign.

Figure 9:
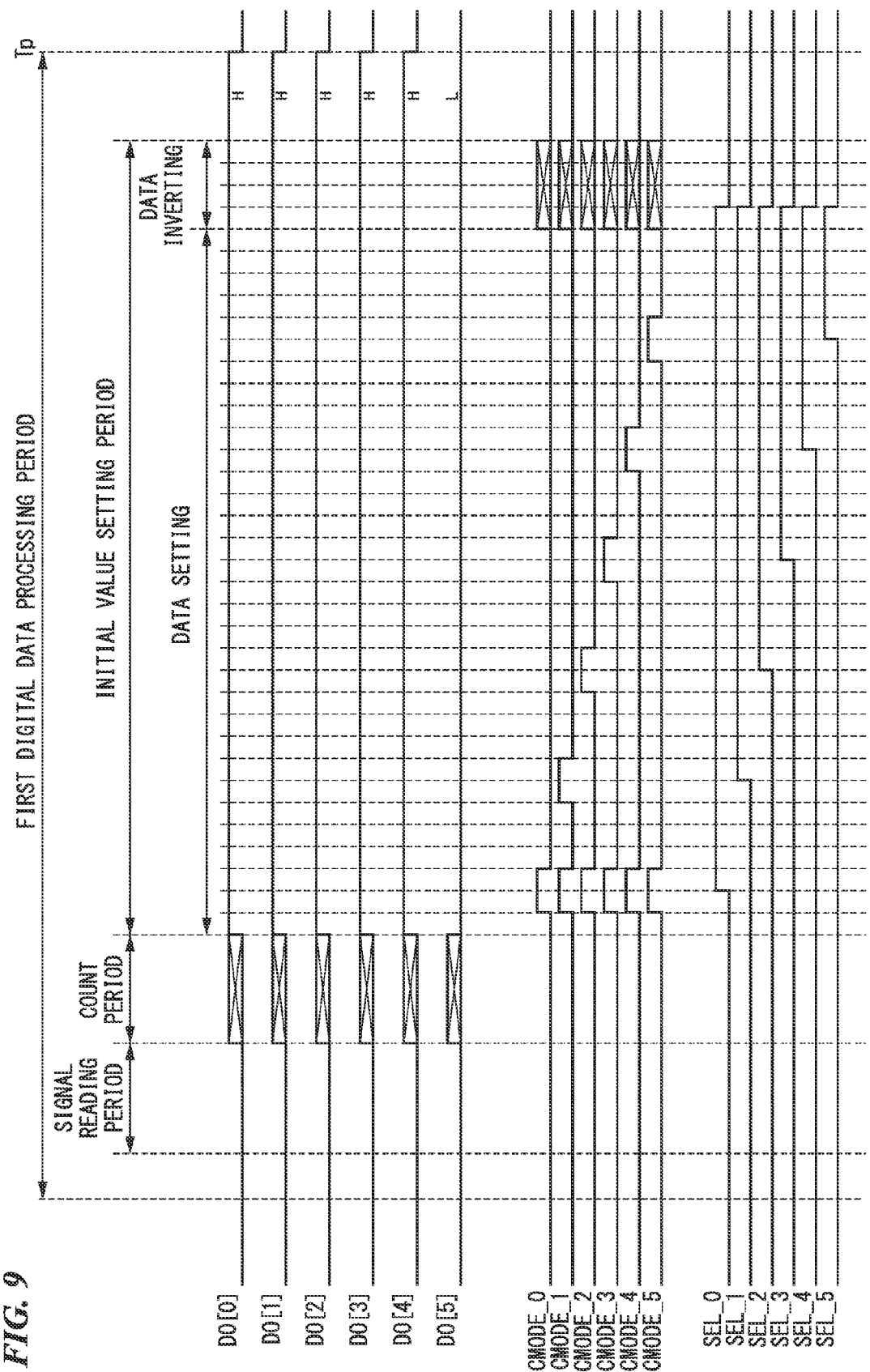
FIG. 9 is a timing chart illustrating a process of the arithmetic unit of the column AD conversion unit included in the image pickup device in accordance with the first preferred embodiment of the present invention.
Figure 10:
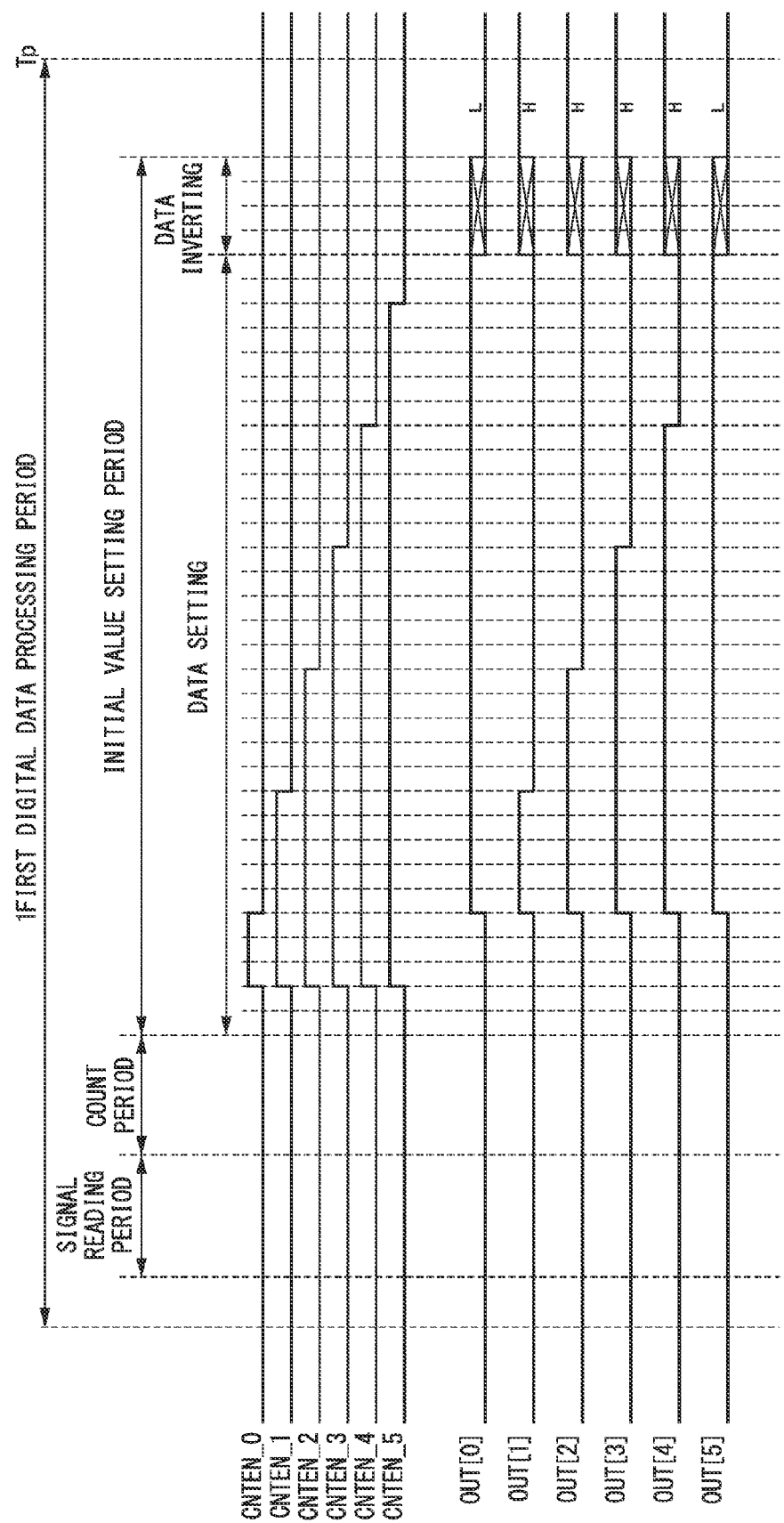
FIG. 10 is a timing chart illustrating a process of the arithmetic unit of the column AD conversion unit included in the image pickup device in accordance with the first preferred embodiment of the present invention.
Figure 11:
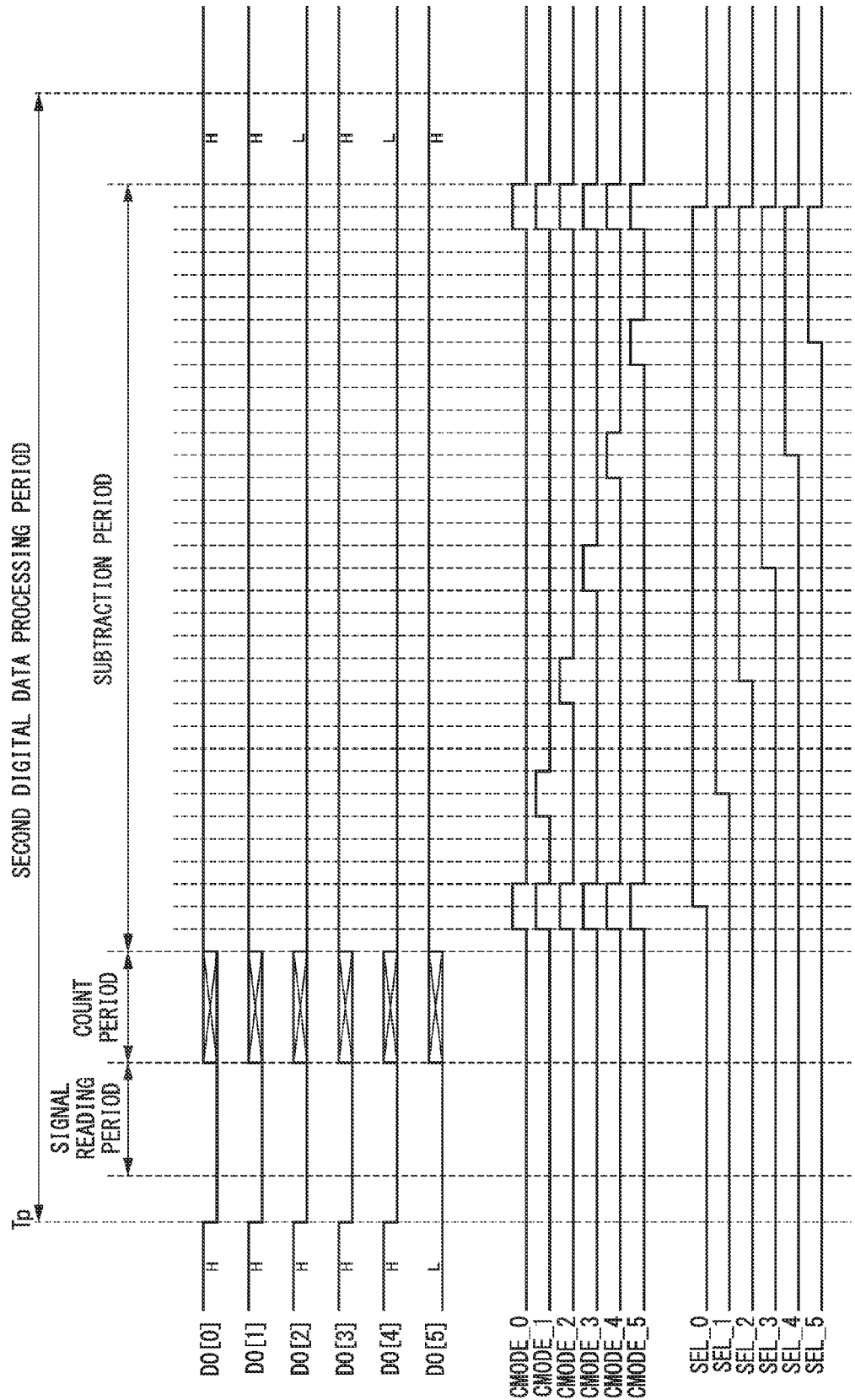
FIG. 11 is a timing chart illustrating a process of the arithmetic unit of the column AD conversion unit included in the image pickup device in accordance with the first preferred embodiment of the present invention.
Figure 12:
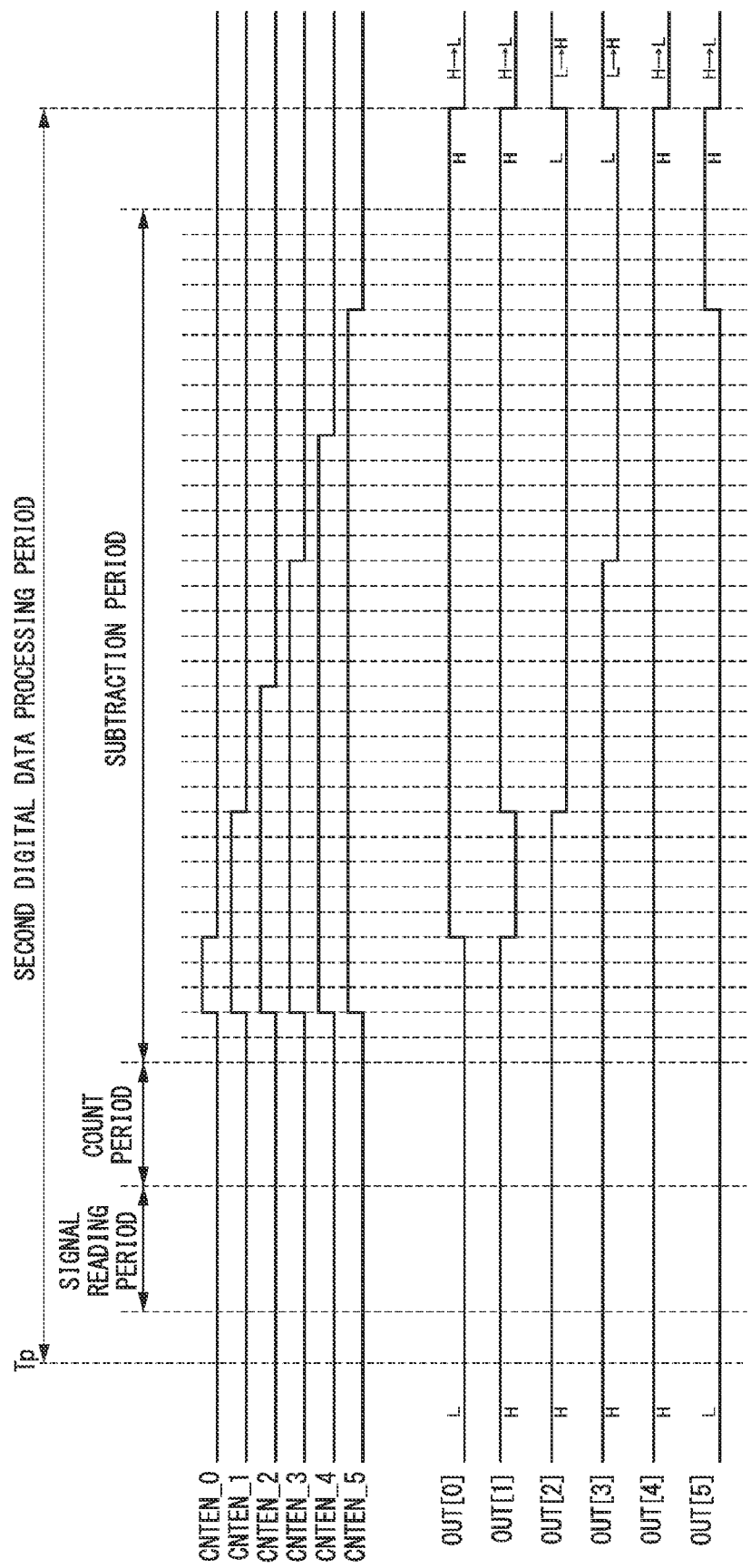
FIG. 12 is a timing chart illustrating a process of the arithmetic unit of the column AD conversion unit included in the image pickup device in accordance with the first preferred embodiment of the present invention.

FIGS. 9 to 12 are diagrams illustrating the waveform of each signal relevant to the process in accordance with this example. FIGS. 9 and 10 illustrate the waveform of each signal relevant to a process for the first digital data. FIGS. 11 and 12 illustrate the waveform of each signal relevant to a process for the second digital data. In FIGS. 9 and 11, DO[0] to DO[5] indicate output signals (output signals of the encoding circuit 106 of the detection unit 110: DO[0] to DO[2] and output signals of the count unit 105: DO[3] to DO[5]) of the detection unit 110 and the count unit 105. In FIGS. 10 and 12, OUT[0] to OUT[5] indicate the output signals of the arithmetic counter circuit 102a of the arithmetic unit 102. In FIGS. 9 to 12, signals relevant to the counters C_6 to C_11 are not illustrated.

The process in accordance with this example includes a process performed during a first digital data processing period in which a process is performed on the first digital data and a process performed during a second digital data processing period in which a process is performed on the second digital data. The first digital data processing period includes a signal reading period in which the pixel signal with the reset level is read, a count period in which the count unit 105 performs the counting based on the low-order phase signal CK6 and the detection unit 110 performs the encoding based on the low-order phase signals CK1 to CK8, and an initial value setting period in which the arithmetic counter circuit 102a sets the initial value of the second digital data processing period. During the initial value setting period, data setting is performed to set values in the counters C_0 to C_5 and data inverting is performed to invert the count values of the counters C_0 to C_5. The second digital data processing period includes a signal reading period in which the pixel signal with the signal level is read, a count period in which the count unit 105 performs the counting based on the low-order phase signal CK6 and the detection unit 110 performs the encoding based on the low-order phase signals CK1 to CK8, and a subtraction period in which the arithmetic counter circuit 102a performs the subtraction.

Here, a case in which a value 12 (6'b00_1100) obtained by subtracting (performing the CDS process) the first digital value from the second digital value will be described on the assumption that the first digital data is set to 6'b01_1111 (the first digital value: 31) and the second digital data is set to 6'b10_1011 (the second digital value: 43).

(Process During First Digital Data Processing Period)

The control signals SEL_0 to SEL_5 are set to the L state, the control signals CNTEN_0 to CNTEN_5 are set to the L state, and the control signals CMODE_0 to CMODE_5 are set to the L state. Since the control signals SEL_0 to SEL_5 are in the L state, the changeover unit MUX_0 selects the DC potential and the changeover units MUX_1 to MUX_5 selects outputs of the counters C_0 to C_4. Since the control signals CMODE_0 to CMODE_5 are in the L state, the process mode of the counters C_0 to C_5 is set to the count mode. The counters C_0 to C_5 are assumed to be reset by a control signal (not illustrated).

During the signal reading period, the pixel signal with the reset level is read. Subsequently, during the count period, the count unit 105 performs the counting based on the low-order phase signal CK6, and then the detection unit 110 performs the encoding based on the low-order phase signals CK1 to CK8 latched by the latch unit 108. Subsequently, a process of the initial value setting period is performed. Hereinafter, the process of the initial value setting period will be described.

The control signals CMODE_0 to CMODE_5 are changed from the L state to the H state. Then, after the process mode of the counters C_0 to C_5 is switched to the data protection mode, the control signals CNTEN_0 to CNTEN_5 are changed from the L state to the H state. Further, after the control signal SEL_0 is changed from the L state to the H state, the control signals CMODE_0 to CMODE_5 are changed from the H state to the L state. That is, after the changeover unit MUX_0 selects the output signal DO[0] of the encoding circuit 106, the process mode of the counters C_0 to C_5 is switched to the count mode. Thus, the output signal DO[0] of the encoding circuit 106 is input to the counter C_0, and the output signals of the counters C_0 to C_4 are input to the counters C_1 to C_5, respectively. Thereafter, the control signal CNTEN_0 is changed from the H state to the L state. Thus, the value (1'b1) of the output signal DO[0] of the encoding circuit 106 is subtracted. At this time, the value retained by the detection unit 110 and the count unit 105 is 6'b01_1111 (corresponding to 31) and the value retained by the arithmetic unit 102 is 6''b11_1111 (corresponding to −1).

Subsequently, the control signal CMODE_1 is changed from the L state to the H state and the process mode of the counter C_1 is switched to the data protection mode. Further, after the control signal SEL_1 is changed from the L state to the H state, the control signal CMODE_1 is changed from the H state to the L state. That is, after the changeover unit MUX_1 selects the output signal DO[1] of the encoding circuit 106, the process mode of the counter C_1 is switched to the count mode. Since the control signals CNTEN_1 to CNTEN_5 are in the H state, the output signal DO[1] of the encoding circuit 106 is input to the counter C_1, and the output signals of the counters C_1 to C_4 are input to the counters C_2 to C_5, respectively. Thereafter, the control signal CNTEN_1 is changed from the H state to the L state. Thus, the value (1'b1) of the output signal DO[1] of the encoding circuit 106 is subtracted. At this time, the value retained by the detection unit 110 and the count unit 105 is 6'b01_1111 (corresponding to 31) and the value retained by the arithmetic unit 102 is 6'b11_1101 (corresponding to −3).

Subsequently, the control signal CMODE_2 is changed from the L state to the H state and the process mode of the counter C_2 is switched to the data protection mode. Further, after the control signal SEL_2 is changed from the L state to the H state, the control signal CMODE_2 is changed from the H state to the L state. That is, after the changeover unit MUX_2 selects the output signal DO[2] of the encoding circuit 106, the process mode of the counter C_2 is switched to the count mode. Since the control signals CNTEN_2 to CNTEN_5 are in the H state, the output signal DO[2] of the encoding circuit 106 is input to the counter C_2, and the output signals of the counters C_2 to C_4 are input to the counters C_3 to C_5, respectively. Thereafter, the control signal CNTEN_2 is changed from the H state to the L state. Thus, the value (1'b1) of the output signal DO[2] of the encoding circuit 106 is subtracted. At this time, the value retained by the detection unit 110 and the count unit 105 is 6'b01_1111 (corresponding to 31) and the value retained by the arithmetic unit 102 is 6'b11_1001 (corresponding to −7).

Subsequently, the control signal CMODE_3 is changed from the L state to the H state and the process mode of the counter C_3 is switched to the data protection mode. Further, after the control signal SEL_3 is changed from the L state to the H state, the control signal CMODE_3 is changed from the H state to the L state. That is, after the changeover unit MUX_3 selects the output signal DO[3] of the count unit 105, the process mode of the counter C_3 is switched to the count mode. Since the control signals CNTEN_3 to CNTEN_5 are in the H state, the output signal DO[3] of the count unit 105 is input to the counter C_3, and the output signals of the counters C_3 and C_4 are input to the counters C_4 and C_5, respectively. Thereafter, the control signal CNTEN_3 is changed from the H state to the L state. Thus, the value (1'b1) of the output signal DO[3] of the count unit 105 is subtracted. At this time, the value retained by the detection unit 110 and the count unit 105 is 6'b01_1111 (corresponding to 31) and the value retained by the arithmetic unit 102 is 6'b11_0001 (corresponding to −15).

Subsequently, the control signal CMODE_4 is changed from the L state to the H state and the process mode of the counter C_4 is switched to the data protection mode. Further, after the control signal SEL_4 is changed from the L state to the H state, the control signal CMODE_4 is changed from the H state to the L state. That is, after the changeover unit MUX_4 selects the output signal DO[4] of the count unit 105, the process mode of the counter C_4 is switched to the count mode. Since the control signals CNTEN_4 and CNTEN_5 are in the H state, the output signal DO[4] of the count unit 105 is input to the counter C_4, and the output signal of the counter C_4 is input to the counter C_5. Thereafter, the control signal CNTEN_4 is changed from the H state to the L state. Thus, the value (1'b1) of the output signal DO[4] of the count unit 105 is subtracted. At this time, the value retained by the detection unit 110 and the count unit 105 is 6'b01_1111 (corresponding to 31) and the value retained by the arithmetic unit 102 is 6'b10_0001 (corresponding to −31).

Subsequently, the control signal CMODE_5 is changed from the L state to the H state and the process mode of the counter C_5 is switched to the data protection mode. Further, after the control signal SEL_5 is changed from the L state to the H state, the control signal CMODE_5 is changed from the H state to the L state. That is, after the changeover unit MUX_5 selects the output signal DO[5] of the count unit 105, the process mode of the counter C_5 is switched to the count mode. Since the control signal CNTEN_5 is in the H state, the output signal DO[5] of the count unit 105 is input to the counter C_5. Thereafter, the control signal CNTEN_5 is changed from the H state to the L state. Thus, the value (1'b0) of the output signal DO[5] of the count unit 105 is subtracted. At this time, the value retained by the detection unit 110 and the count unit 105 is 6'b01_1111 (corresponding to 31) and the value retained by the arithmetic unit 102 is 6'b10_0001 (corresponding to −31).

Thereafter, the count value of the arithmetic unit 102 is inverted. At this time, the value retained by the detection unit 110 and the count unit 105 is 6'b01_1111 (corresponding to 31) and the value retained by the arithmetic unit 102 is 6'b01_1110 (corresponding to 30). Since the arithmetic counter circuit 102a subtracts the first digital data, the same value as the first digital data retained by the detection unit 110 and the count unit 105 can be set as an initial value of the arithmetic counter circuit 102a by adding 1 after the inversion of the count value of the arithmetic counter circuit 102a. However, as will be described below, the change of the value caused due to addition of 1 after each inversion is cancelled, since the value is inverted even during the second digital data processing period.

Accordingly, in this example, 1 is not added after the value is inverted.

(Process During Second Digital Data Processing Period)

The control signals SEL_0 to SEL_5 are set to the L state, the control signals CNTEN_0 to CNTEN_5 are set to the L state, and the control signals CMODE_0 to CMODE_5 are set to the L state. Further, the counters C_0 to C_5 are not reset. At the start time of the subtraction (CDS process), the value retained by the detection unit 110 and the count unit 105 is 6'b10_1011 (corresponding to 43) and the value retained by the arithmetic counter circuit 102a is 6'b01_1110 (corresponding to 30).

During the signal reading period, the pixel signal with the signal level is read. Subsequently, during the count period, the count unit 105 performs the counting based on the low-order phase signal CK6, and then the detection unit 110 performs the encoding based on the low-order phase signals CK1 to CK8 latched by the latch unit 108. Subsequently, a process of the subtraction period is performed. Hereinafter, the process of the subtraction period will be described.

During the subtraction period, the arithmetic counter circuit 102a sequentially performs the subtraction based on the value of each of bits constituting the second digital data retained by the detection unit 110 and the count unit 105. The control signals CMODE_0 to CMODE_5 are changed from the L state to the H state. Then, after the process mode of the counters C_0 to C_5 is switched to the data protection mode, the control signals CNTEN_0 to CNTEN_5 are changed from the L state to the H state. Further, after the control signal SEL_0 is changed from the L state to the H state, the control signals CMODE_0 to CMODE_5 are changed from the H state to the L state. That is, after the changeover unit MUX_0 selects the output signal DO[0] of the encoding circuit 106, the process mode of the counters C_0 to C_5 is switched to the count mode. Thus, the output signal DO[0] of the encoding circuit 106 is input to the counter C_0, and the output signals of the counters C_0 to C_4 are input to the counters C_1 to C_5, respectively. Thereafter, the control signal CNTEN_0 is changed from the H state to the L state. Thus, the value (1'b1) of the output signal DO[0] of the encoding circuit 106 is subtracted. At this time, the value retained by the detection unit 110 and the count unit 105 is 6'b10_1011 (corresponding to 43) and the value retained by the arithmetic unit 102 is 6'b01_1101 (corresponding to 29).

Subsequently, the control signal CMODE_1 is changed from the L state to the H state and the process mode of the counter C_1 is switched to the data protection mode. Further, after the control signal SEL_1 is changed from the L state to the H state, the control signal CMODE_1 is changed from the H state to the L state. That is, after the changeover unit MUX_1 selects the output signal DO[1] of the encoding circuit 106, the process mode of the counter C_1 is switched to the count mode. Since the control signals CNTEN_1 to CNTEN_5 are in the H state, the output signal DO[1] of the encoding circuit 106 is input to the counter C_1, and the output signals of the counters C_1 to C_4 are input to the counters C_2 to C_5, respectively. Thereafter, the control signal CNTEN_1 is changed from the H state to the L state. Thus, the value (1'b1) of the output signal DO[1] of the encoding circuit 106 is subtracted. At this time, the value retained by the detection unit 110 and the count unit 105 is 6'b10_1011 (corresponding to 43) and the value retained by the arithmetic unit 102 is 6'b01_1011 (corresponding to 27).

Subsequently, the control signal CMODE_2 is changed from the L state to the H state and the process mode of the counter C_2 is switched to the data protection mode. Further, after the control signal SEL_2 is changed from the L state to the H state, the control signal CMODE_2 is changed from the H state to the L state. That is, after the changeover unit MUX_2 selects the output signal DO[2] of the encoding circuit 106, the process mode of the counter C_2 is switched to the count mode. Since the control signals CNTEN_2 to CNTEN_5 are in the H state, the output signal DO[2] of the encoding circuit 106 is input to the counter C_2, and the output signals of the counters C_2 to C_4 are input to the counters C_3 to C_5, respectively. Thereafter, the control signal CNTEN_2 is changed from the H state to the L state. Thus, the value (1'b0) of the output signal DO[2] of the encoding circuit 106 is subtracted. At this time, the value retained by the detection unit 110 and the count unit 105 is 6'b10_1011 (corresponding to 43) and the value retained by the arithmetic unit 102 is 6'b01_1011 (corresponding to 27).

Subsequently, the control signal CMODE_3 is changed from the L state to the H state and the process mode of the counter C_3 is switched to the data protection mode. Further, after the control signal SEL_3 is changed from the L state to the H state, the control signal CMODE_3 is changed from the H state to the L state. That is, after the changeover unit MUX_3 selects the output signal DO[3] of the count unit 105, the process mode of the counter C_3 is switched to the count mode. Since the control signals CNTEN_3 to CNTEN_5 are in the H state, the output signal DO[3] of the count unit 105 is input to the counter C_3, and the output signals of the counters C_3 and C_4 are input to the counters C_4 and C_5, respectively. Thereafter, the control signal CNTEN_3 is changed from the H state to the L state. Thus, the value (1'b1) of the output signal DO[3] of the count unit 105 is subtracted. At this time, the value retained by the detection unit 110 and the count unit 105 is 6'b10_1011 (corresponding to 43) and the value retained by the arithmetic unit 102 is 6'b01_0011 (corresponding to 19).

Subsequently, the control signal CMODE_4 is changed from the L state to the H state and the process mode of the counter C_4 is switched to the data protection mode. Further, after the control signal SEL_4 is changed from the L state to the H state, the control signal CMODE_4 is changed from the H state to the L state. That is, after the changeover unit MUX_4 selects the output signal DO[4] of the count unit 105, the process mode of the counter C_4 is switched to the count mode. Since the control signals CNTEN_4 and CNTEN_5 are in the H state, the output signal DO[4] of the count unit 105 is input to the counter C_4, and the output signal of the counter C_4 is input to the counter C_5. Thereafter, the control signal CNTEN_4 is changed from the H state to the L state. Thus, the value (1'b0) of the output signal DO[4] of the count unit 105 is subtracted. At this time, the value retained by the detection unit 110 and the count unit 105 is 6'b10_1011 (corresponding to 43) and the value retained by the arithmetic unit 102 is 6'b01_0011 (corresponding to 19).

Subsequently, the control signal CMODE_5 is changed from the L state to the H state and the process mode of the counter C_5 is switched to the data protection mode. Further, after the control signal SEL_5 is changed from the L state to the H state, the control signal CMODE_5 is changed from the H state to the L state. That is, after the changeover unit MUX_5 selects the output signal DO[5] of the count unit 105, the process mode of the counter C_5 is switched to the count mode. Since the control signal CNTEN_5 is in the H state, the output signal DO[5] of the count unit 105 is input to the counter C_5. Thereafter, the control signal CNTEN_5 is changed from the H state to the L state. Thus, the value (1'b1) of the output signal DO[5] of the count unit 105 is subtracted. At this time, the value retained by the detection unit 110 and the count unit 105 is 6'b10_1011 (corresponding to 43) and the value retained by the arithmetic unit 102 is 6'b11_0011 (corresponding to −13).

Finally, the count value of the arithmetic unit 102 is inverted. At this time, the value retained by the detection unit 110 and the count unit 105 is 6'b10_1011 (corresponding to 43) and the value retained by the arithmetic counter circuit 102a is 6'b00_1100 (corresponding to 12). As described above, in this example, 1 is not added after the inversion of the value, since the value is inverted even during the first digital data processing period and 1 is not added.

Figure 13:
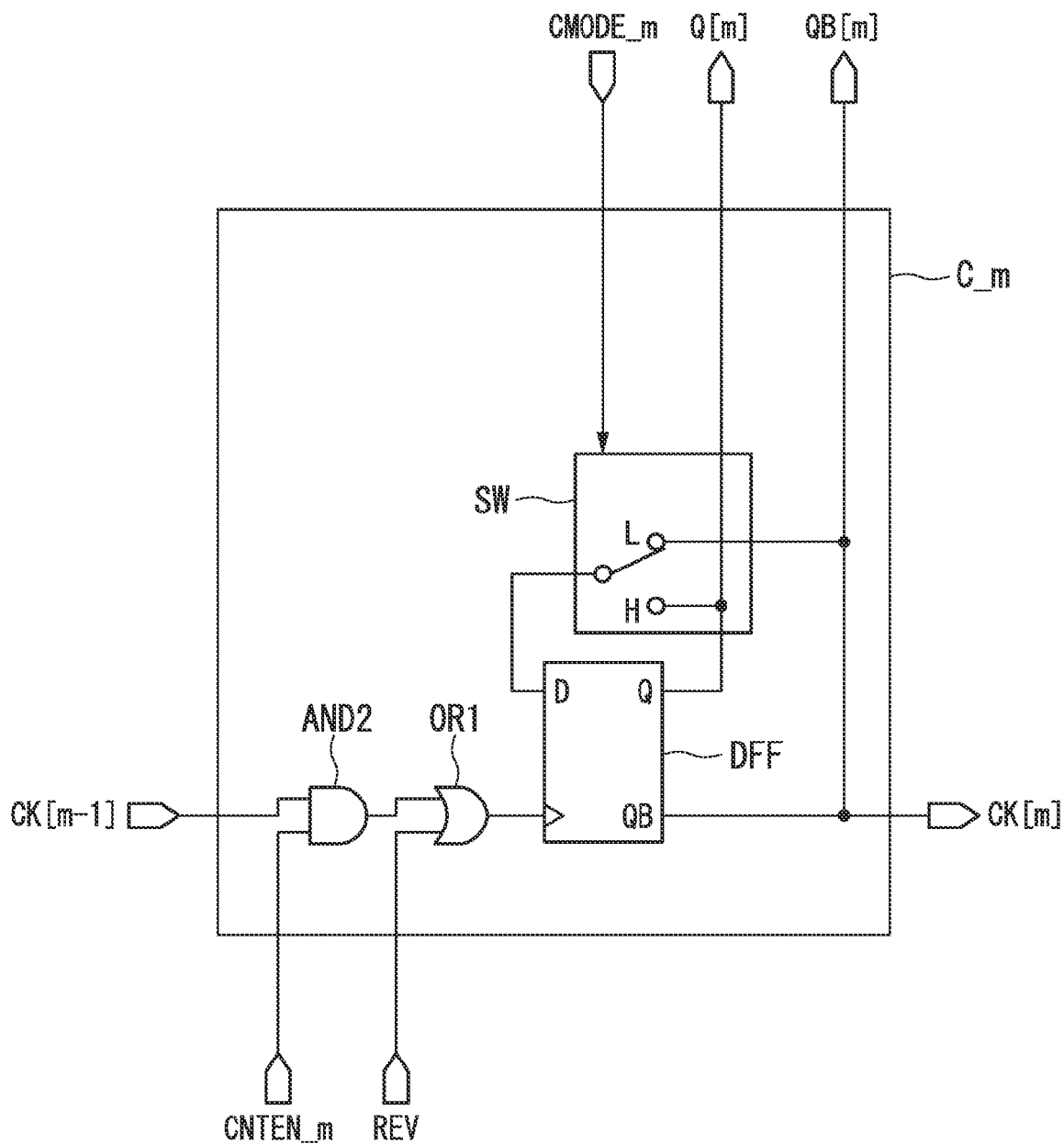
FIG. 13 is a circuit diagram illustrating the configuration of a counter in accordance with the first preferred embodiment of the present invention.

Next, the counter used in the arithmetic counter circuit 102a of the arithmetic unit 102 will be described in detail. FIG. 13 is a diagram illustrating an example of the configuration (excluding the changeover units MUX_0 to MUX_11) of a 1-bit counter C_m (m: 0 to 11) included in the arithmetic counter circuit 102a. The counter C_m illustrated in FIG. 13 includes a flip-flop circuit DFF, an AND circuit AND2, an OR circuit OR1, and a changeover switch SW. The arithmetic counter circuit 102a may include a so-called up/down-counter that has an up-count mode and a down-count mode.

The flip-flop circuit DFF includes a D flip-flop. A signal output from an inversion output terminal QB of the flip-flop circuit DFF becomes an input signal CK[m] of the counter of the subsequent stage. The AND circuit AND2 outputs a pulse used to validate/invalidate a count clock by performing an AND operation of an input signal CK[m−1] and a control signal CNTEN_m. The OR circuit OR1 generates a pulse used to invert a bit by performing an OR operation of an output signal of the AND circuit AND2 and the control signal REV. The changeover switch SW changes over a connection state of an input terminal D and an output terminal Q and a connection state of the input terminal D and the inversion output terminal QB based on the control signal CMODE_m to protect a bit value. When the changeovers MUX-m and the counters C_m are connected by n, an n-bit counter circuit is configured. This configuration is merely an example, and the present invention is not limited thereto.

Figure 14:
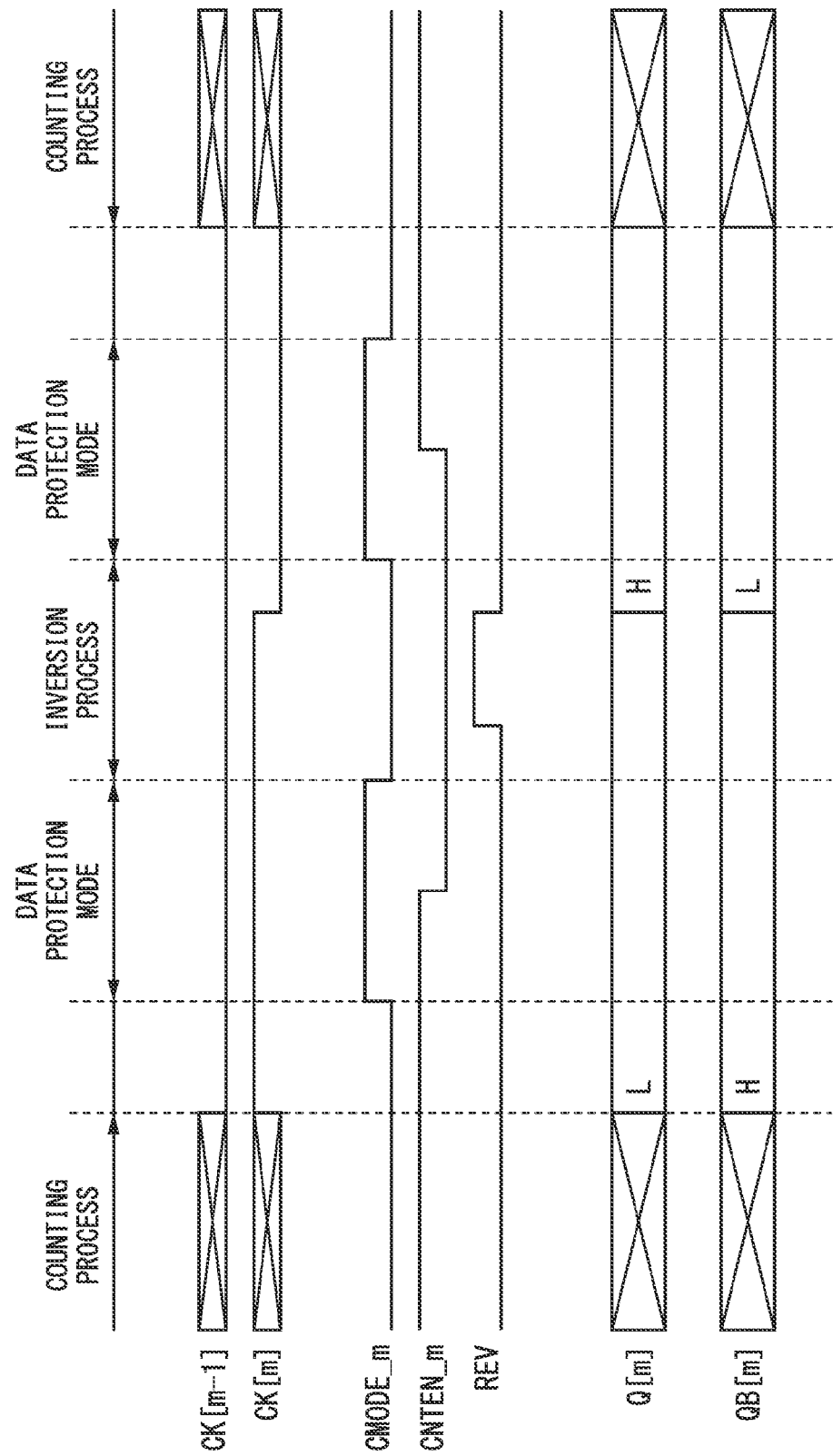
FIG. 14 is a timing chart illustrating a process of the counter in accordance with the first preferred embodiment of the present invention.

Next, a process of the counter C_m, particularly, a bit inversion process, will be described. FIG. 14 is a timing chart illustrating the waveform of each signal relevant to the process of the counter C_m, particularly, the waveform of each signal relevant to a process, mainly, to a bit inversion process. The control signal CMODE_m at the time of the counting process is in the L state, the control signal CNTEN_m is in the H state, and the control signal REV is in the L state.

After the counting process, the control signal CMODE_m enters the H state. Thus, since the output terminal Q and the input terminal D of the counter C_m are connected, the output signal of the counter C_m maintains a constant state without change, and thus each bit value is protected. Subsequently, the control signal CNTEN_m enters the L state. Thus, the input of the count clock is invalidated.

Subsequently, the control signal CMODE_m enters the L state, and thus the inversion output terminal QB and the input terminal D of the counter C_m are connected. That is, the state of the signal input to the input terminal D is inverted. Thereafter, the control signal REV is changed from the L state to the H state, and then is changed to the L state. When the control signal REV is changed from the H state to the L state, the flip-flop circuit DFF retains the signal input to the input terminal D and outputs the signal from the output terminal Q. As described above, the state of the signal input to the input terminal D is inverted when the control signal CMODE_m enters the L state. Therefore, by changing the control signal REV from the H state to the L state, the output signal of the counter C_m, that is, each bit value, is inverted.

Thereafter, the control signal CMODE_m enters the H state. Thus, since the output terminal Q and the input terminal D of the counter C_m are connected, the output signal of the counter C_m maintains a constant state without change, and thus each bit value is protected. Subsequently, the control signal CNTEN_m enters the H state. Thus, the input of the count clock is validated. Finally, the control signal CMODE_m enters the L state, and the inversion output terminal QB and the input terminal D of the counter C_m are connected. Through the above-described process, the counting process can be performed again using a value inverted from each bit value as an initial value.

In the first preferred embodiment, as described above, since the binarization and subtraction can be performed in a column unit installed in each column or each plurality of columns of the pixels, phase focusing of the signal can be simplified, and thus the image pickup device can realize a high speed and a high number of pixels.

The VCO 100 includes the odd delay units. The VCO 100 is configured as an oscillation circuit that includes the first path along which a signal is transmitted through the delay units and the second path along which a signal is detoured around some of the delay units to be transmitted. Thus, the power-of-two signals with different phases at a constant interval can be acquired.

By encoding the low-order phase signals using the detection circuit 107 and the encoding circuit 106, the low-order phase signal can be encoded with a simple circuit.

The subtraction between the first digital data and the second digital data can be performed by setting the initial value in the arithmetic counter circuit 102a based on the value of each of the bits constituting the first digital data by the arithmetic counter circuit 102a of the arithmetic unit 102, and then sequentially counting the value of each of the bits constituting the second digital data by the arithmetic counter circuit 102a. In this way, the subtraction of the digital data can be performed with the sample circuit.

Second Preferred Embodiment

Next, a second preferred embodiment of the present invention will be described.

Figure 15:
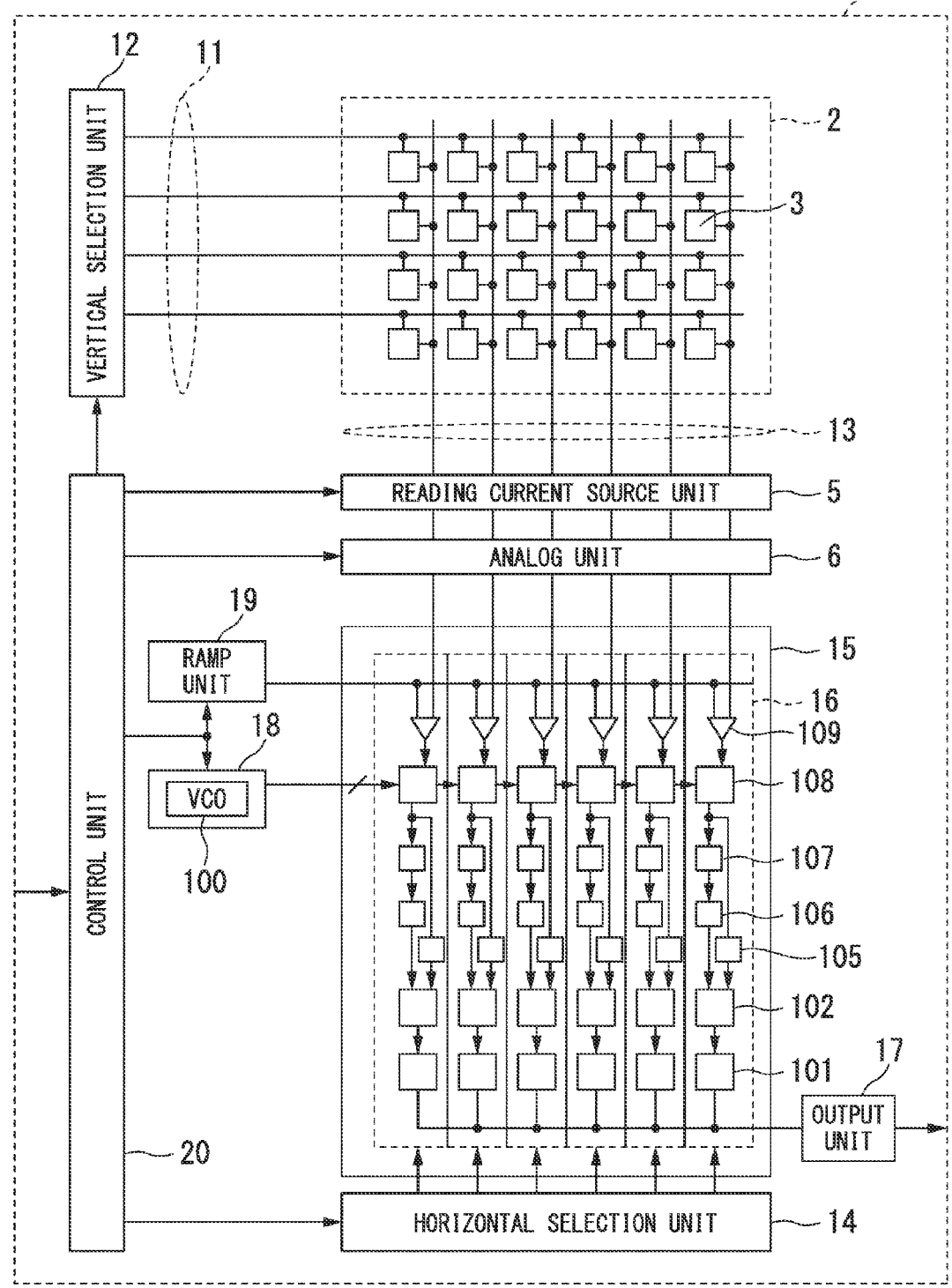
FIG. 15 is a block diagram illustrating the configuration of an image pickup device in accordance with a second preferred embodiment of the present invention.

FIG. 15 is a diagram illustrating an example of the overall configuration of a (C)MOS image pickup device in accordance with the second preferred embodiment. The configuration of an encoding circuit 106 is different from that of the first preferred embodiment. Memory units 101 are added to the configuration of the first preferred embodiment. The memory unit 101 retains digital data subjected to subtraction (CDS process) by the arithmetic unit 102. Since the other configuration is substantially the same, a description thereof will be omitted here.

Since a process of this example is substantially the same as that of the first preferred embodiment, a description thereof will be omitted here. By providing the memory units 101, an AD conversion process and a horizontal transmission process can be performed in parallel. For example, a pixel signal can be read for each row, the digital data of an $n^{th}$ pixel signal can be stored in the memory unit 101, and the digital data of the $n^{th}$ pixel signal can be transmitted to the output unit 17 during an AD conversion period of an $n+1^{th}$ pixel signal. Further, the memory units 101 may be provided in the first preferred embodiment.

Figure 16:
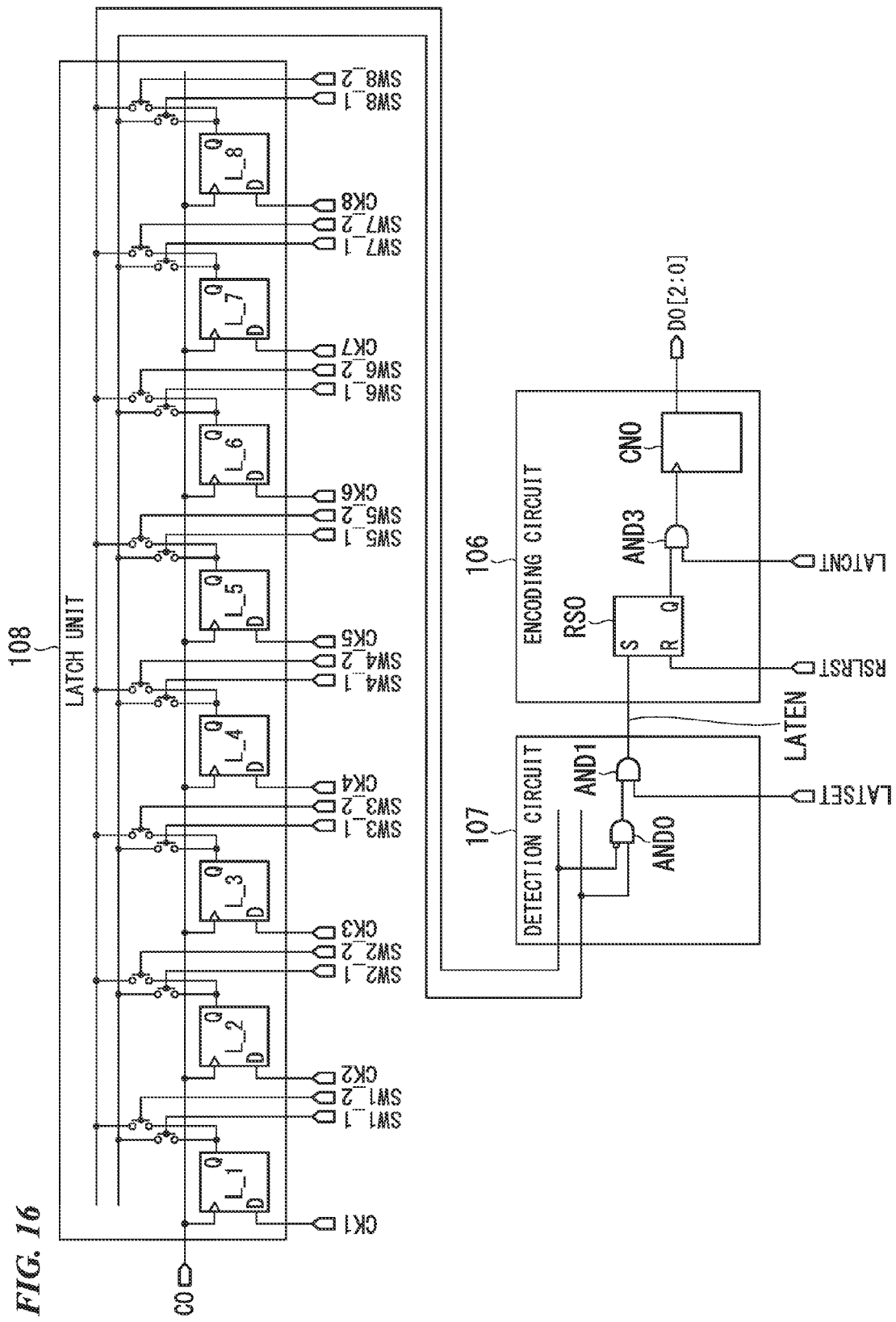
FIG. 16 is a circuit diagram illustrating the configurations of a latch unit, a detection circuit, and an encoding circuit of a column AD conversion unit included in the image pickup device in accordance with the second preferred embodiment of the present invention.

Next, the encoding circuit 106 will be described in detail. FIG. 16 is a diagram illustrating the configurations of a latch unit 108, a detection circuit 107, and the encoding circuit 106. Since the configurations of the latch unit 108 and the detection circuit 107 are substantially the same as those of the first preferred embodiment, the description thereof will be omitted. The encoding circuit 106 includes an RS latch RS0, an AND circuit AND3, and a counter circuit CN0.

A detection result LATEN from the AND circuit AND1 of the detection circuit 107 and a control signal RSLRST are input to the RS latch RS0. After the RS latch RS0 is reset by the control signal RSLRST, an output signal of the RS latch RS0 is changed from the L state to the H state when the detection result LATEN is changed from the L state to the H state. Thereafter, the output signal is maintained in the H state irrespective of the state of the detection result LATEN, until the RS latch RS0 is reset by the control signal RSLRST. The output signal of the RS latch RS0 and a count signal LATCNT are input to the AND circuit AND3. The AND circuit AND3 generates low-order count signals performing an AND operation on the input two signals. The low-order count signals from the AND circuit AND3 are input to the counter circuit CN0. The counter circuit CN0 performs counting using the low-order count signal as a count clock and confirms an encoding value.

Figure 17:
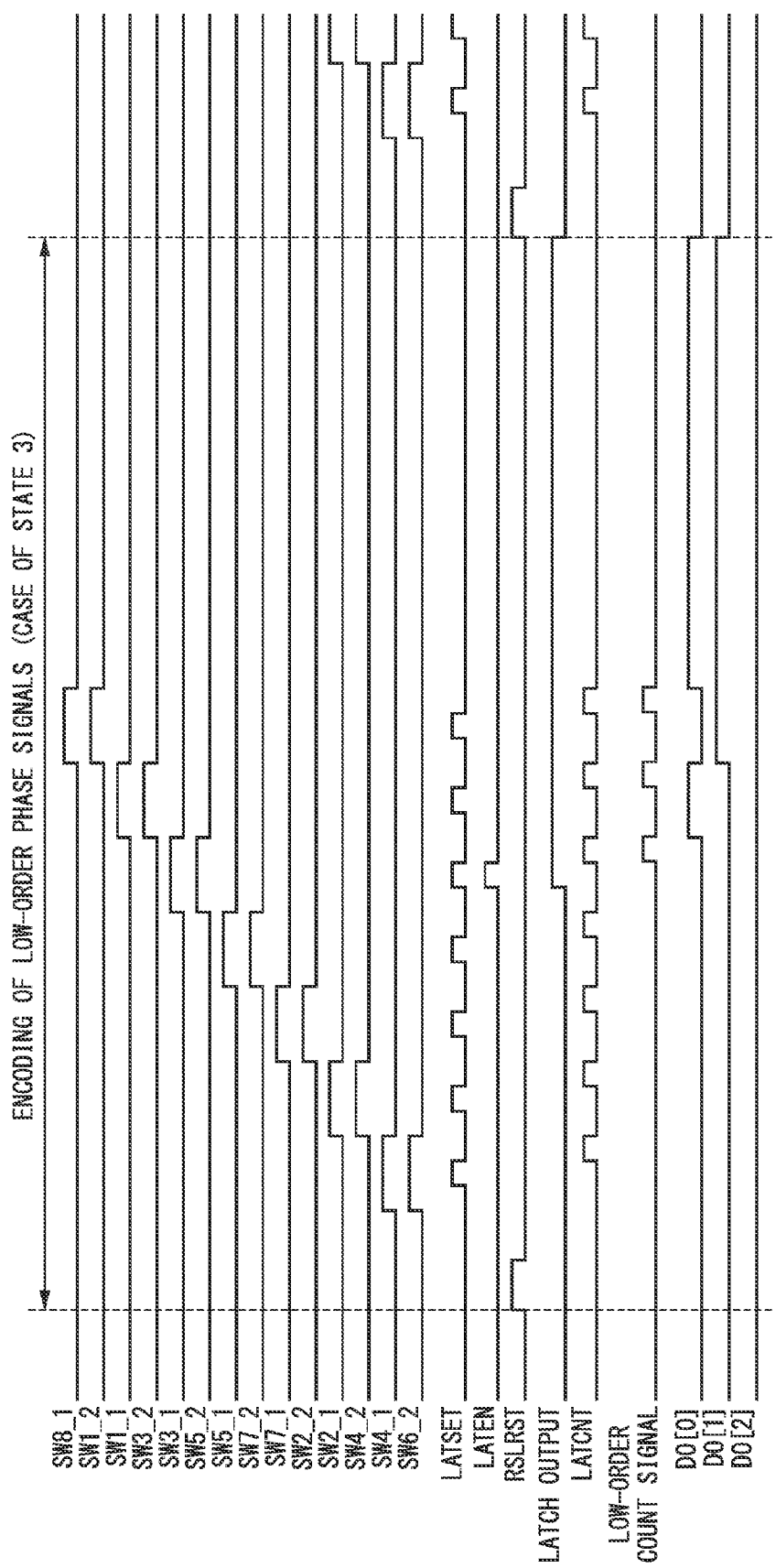
FIG. 17 is a timing chart illustrating a detection sequence of a thermometer code in the image pickup device in accordance with the second preferred embodiment of the present invention.
Figure 18:
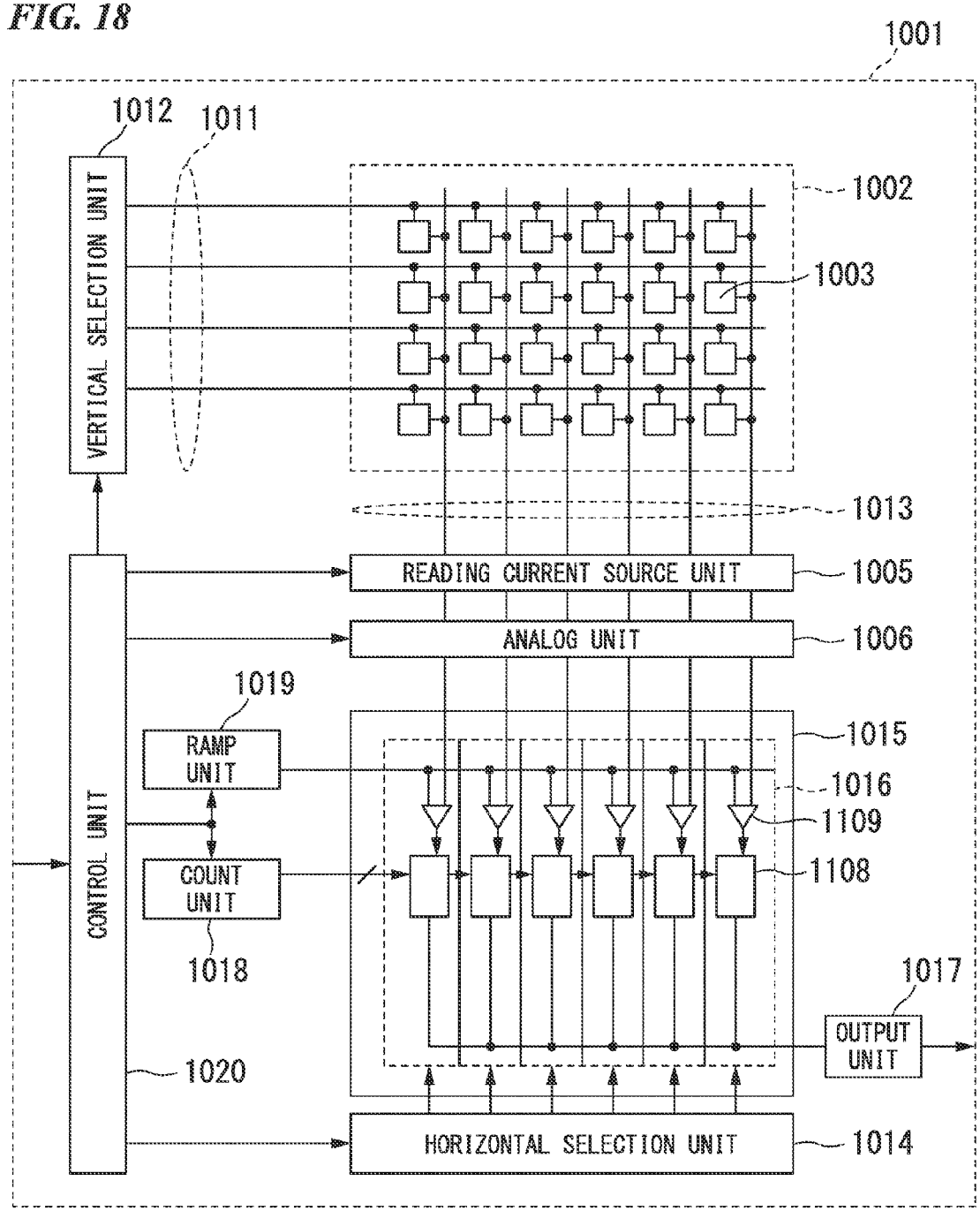
FIG. 18 is a block diagram illustrating the configuration of an image pickup device in accordance with the related art.

Next, processes of the detection circuit 107 and the encoding circuit 106 will be described. FIG. 17 is a diagram illustrating the waveform of each signal relevant to the processes of the detection circuit 107 and the encoding circuit 106. Hereinafter, a case in which the states of the low-order phase signals CK0 to CK8 retained by the latch unit 108 are "state 3" is an exemplary example.

First, an overview of a process will be described. The low-order phase signals are input from the latch circuit selected from the latch circuits L_1 to L_8 retaining the low-order phase signals CK1 to CK8 to the detection circuit 107 by the control signals SW1_1 to SW8_1 and the control signals SW1_2 to SW8_2, and thus the thermometer code (in this example, an edge position changed from the H state to the L state) is detected based on the input low-order phase signal. The thermometer code is detected when the result of the AND operation of the low-order phase signal CK* (where * is any one of 1 to 8) output from the latch circuit L_* (where * is any one of 1 to 8) and a signal inverted from the low-order phase signal CK* is the H state. A method of detecting the thermometer code is the same as that of the first preferred embodiment.

At a detection timing of the thermometer code, the low-order count signals including the number of pulses according to the states of the low-order phase signals CK0 to CK8 start to be generated, and the counter circuit CN0 starts counting the low-order count signals. Count values DO[0] to DO[2] of the counter circuit CN0 at the time of the end of the counting are encoding results.

Hereinafter, detailed processes corresponding to <sequence (1)> to <sequence (7)> described above will be described. By changing the comparison output CO of the comparison unit 109 at a timing at which a predetermined condition is satisfied, the logic states of the low-order phase signals CK1 to CK8 output from the VCO 100 are retained in the latch unit 108. Subsequently, the RS latch RS0 is reset by the control signal RSLRST. At this time, the output signal of the RS latch RS0 is in the L state. Subsequently, control signals SW*_1 (*: 1 to 8) and control signals SW*_2 (*: 1 to 8) enter the H state in a predetermined order.

(Sequence 1)

When the control signals SW6_2 and SW4_1 enter the H state, the low-order phase signal CK6 (the L state) retained in the latch circuit L_6 is input to the AND circuit AND0 and a signal inverted from the low-order phase signal CK4 (the H state or the L state) retained in the latch circuit L_4 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. Therefore, the output signal of the RS latch RS0 remains in the L state, and thus the low-order count signals are not generated. At this time, the output signal DO[2:0] of the counter circuit CN0 is 3'b000.

(Sequence 2)

Subsequently, when the control signals SW4_2 and SW2_1 enter the H state, the low-order phase signal CK4 (the H state or the L state) retained in the latch circuit L_4 is input to the AND circuit AND0 and a signal inverted from the low-order phase signal CK2 (the H state) retained in the latch circuit L_2 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. Therefore, the output signal of the RS latch RS0 remains in the L state, and thus the low-order count signals are not generated. At this time, the output signal DO[2:0] of the counter circuit CN0 is 3'b000.

(Sequence 3)

Subsequently, when the control signals SW2_2 and SW7_1 enter the H state, the low-order phase signal CK2 (the H state) retained in the latch circuit L_2 is input to the AND circuit AND0 and a signal inverted from the low-order phase signal CK7 (the H state) retained in the latch circuit L_7 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. Therefore, the output signal of the RS latch RS0 remains in the L state, and thus the low-order count signals are not generated. At this time, the output signal DO[2:0] of the counter circuit CN0 is 3'b000.
(Sequence 4)

Subsequently, when the control signals SW7_2 and SW5_1 enter the H state, the low-order phase signal CK7 (the H state) retained in the latch circuit L_7 is input to the AND circuit AND0 and a signal inverted from the low-order phase signal CK5 (the H state) retained in the latch circuit L_5 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. Therefore, the output signal of the RS latch RS0 remains in the L state, and thus the low-order count signals are not generated. At this time, the output signal DO[2:0] of the counter circuit CN0 is 3'b000.
(Sequence 5)

Subsequently, when the control signals SW5_2 and SW3_1 enter the H state, the low-order phase signal CK5 (the H state) retained in the latch circuit L_5 is input to the AND circuit AND0 and a signal inverted from the low-order phase signal CK3 (the L state) retained in the latch circuit L_3 is input to the AND circuit AND0. Thus, the output signal of the AND circuit AND0 enters the H state. Thereafter, after the control signal LATSET is changed from the L state to the H state, the control signal LATSET enters the L state. Meanwhile, after the detection result LATEN is changed from the L state to the H state, the detection result LATEN enters the L state. Therefore, the output signal of the RS latch RS0 enters the H state. Subsequently, after the count signal LATCNT is changed from the L state to the H state and then enters the L state, the low-order count signal corresponding to 1 pulse is output from the AND circuit AND3 and the counter circuit CN0 performs the counting. At this time, the output signal DO[2:0] of the counter circuit CN0 is 3'b001.
(Sequence 6)

Subsequently, when the control signals SW3_2 and SW1_1 enter the H state, the low-order phase signal CK3 (the L state) retained in the latch circuit L_3 is input to the AND circuit AND0 and a signal inverted from the low-order phase signal CK1 (the L state) retained in the latch circuit L_1 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. Therefore, the output signal of the RS latch RS0 remains in the H state. Subsequently, after the count signal LATCNT is changed from the L state to the H state and then enters the L state, the low-order count signal corresponding to 1 pulse is output from the AND circuit AND3 and the counter circuit CN0 performs the counting. At this time, the output signal DO[2:0] of the counter circuit CN0 is 3'b010.
(Sequence 7)

Subsequently, when the control signals SW1_2 and SW8_1 enter the H state, the low-order phase signal CK1 (the L state) retained in the latch circuit L_1 is input to the AND circuit AND0 and a signal inverted from the low-order phase signal CK8 (the L state) retained in the latch circuit L_8 is input to the AND circuit AND0. Thus, the output signal of the AND circuit AND0 enters the L state. Thereafter, after the control signal LATSET is changed from the L state to the H state, the control signal LATSET enters the L state. Meanwhile, the detection result LATEN remains in the L state without change. Therefore, the output signal of the RS latch RS0 remains in the H state. Subsequently, after the count signal LATCNT is changed from the L state to the H state and then enters the L state, the low-order count signal corresponding to 1 pulse is output from the AND circuit AND3 and the counter circuit CN0 performs the counting. At this time, the output signal DO[2:0] of the counter circuit CN0 is 3'b011.

Thereafter, the control signals SW1_2 and SW8_1 enter the L state. The encoding value (DO[2:0]=3'b011) corresponding to "state 3" is confirmed through the above-described process.

In the second preferred embodiment, since the binarization and subtraction can be performed in a column unit installed in each column or each plurality of columns of the pixels, phase focusing of the signal can be simplified, and thus the image pickup device can realize a high speed and a high number of pixels.

While preferred embodiments of the present invention have been described and illustrated above, it should be understood that these are examples of the present invention and are not to be considered as limiting. Additions, omissions, substitutions, and other modifications can be made without departing from the scope of the present invention.

What is claimed is:
1. An image pickup device comprising:
an image capturing unit that includes a plurality of pixels arrayed in a matrix form and each outputting a first pixel signal according to a reset level and a second pixel signal according to a signal level;
a reference signal generation unit that generates a reference signal increasing or decreasing over time;
a comparison unit that is disposed for each column or each plurality of columns, compares analog signals to the reference signal, and ends the comparison process at a timing at which the reference signal satisfies a predetermined condition with respect to the analog signals;
a clock generation unit that includes a delay circuit including a plurality of delay units connected to each other and outputs low-order phase signals configured with output signals of the plurality of delay units;
a latch unit that is disposed for each column or each plurality of columns and retains the low-order phase signal as a latch signal at a timing related to the end of the comparison process;
a count unit that is disposed for each column or each plurality of columns, counts a signal related to one of the low-order phase signals, and generates a high-order digital signal;
a detection unit that is disposed for each column or each plurality of columns, and generates a low-order digital signal by sequentially comparing logic states of a plurality of bits of the latch signal retained by the corresponding latch unit and encoding the latch signal based on a comparison result of the logic states; and
an arithmetic unit that is disposed for each column or each plurality of columns and performs an arithmetic process based on the high-order digital signal of the corresponding count unit and the low-order digital signal of the corresponding detection unit, and wherein
the analog signals are the first and second pixel signals,
the count unit generates a first high-order digital signal according to the first pixel signal and generates a second high-order digital signal according to the second pixel signal, the detection unit generates a first low-order digital signal according to the first pixel signal and generates a second low-order digital signal according to the second pixel signal, and the arithmetic unit performs subtraction between first digital data related to the first high-order digital signal and the first low-order digital signal and second digital data related to the second high-order digital signal and the second low-order digital signal.

2. The image pickup device according to claim 1, wherein the delay circuit includes n delay units where n is an odd number equal to or greater than 3, and the delay circuit is an oscillation circuit including a first path along which a signal is transmitted through the n delay units and a second path along which a signal is detoured around some of the n delay units to be transmitted.

3. The image pickup device according to claim 2, wherein the detection unit includes a detection circuit and an encoding circuit, the detection circuit sequentially selects and compares two latch signals output from two delay units and corresponding to the low-order phase signals among the latch signals retained by the corresponding latch unit, and the detection circuit outputs a state change detection signal when detecting that the two latch signals are in a predetermined state, and when an encoding signal having a state according to a combination of the two latch signals compared by the detection circuit is input and the state change detection signal is input, the encoding circuit latches the encoding signal.

4. The image pickup device according to claim 2, wherein the arithmetic unit includes a counter circuit, and the counter circuit performs the subtraction between the first digital data and the second digital data by setting an initial value based on a value of each of bits constituting the first digital data, and then sequentially counting a value of each of bits constituting the second digital data.

5. The image pickup device according to claim 1, wherein the detection unit includes a detection circuit and an encoding circuit, the detection circuit sequentially selects and compares two latch signals output from two delay units and corresponding to the low-order phase signals among the latch signals retained by the corresponding latch unit, and the detection circuit outputs a state change detection signal when detecting that the two latch signals are in a predetermined state, and when an encoding signal having a state according to a combination of the two latch signals compared by the detection circuit is input and the state change detection signal is input, the encoding circuit latches the encoding signal.

6. The image pickup device according to claim 1, wherein the arithmetic unit includes a counter circuit, and the counter circuit performs the subtraction between the first digital data and the second digital data by setting an initial value based on a value of each of bits constituting the first digital data, and then sequentially counting a value of each of bits constituting the second digital data.

\* \* \* \* \*